(12) United States Patent
Imhauser et al.

(10) Patent No.: US 10,198,968 B2
(45) Date of Patent: Feb. 5, 2019

(54) METHOD FOR CREATING A COMPUTER MODEL OF A JOINT FOR TREATMENT PLANNING

(71) Applicant: Hospital for Special Surgery, New York, NY (US)

(72) Inventors: Carl Imhauser, South Orange, NJ (US); Kevin Schafer, St. Louis, MO (US)

(73) Assignee: Hospital for Special Surgery, New York, NY (US)

( * ) Notice: Subject to any disclaimer, the term of this patent is extended or adjusted under 35 U.S.C. 154(b) by 134 days.

(21) Appl. No.: 15/372,179

(22) Filed: Dec. 7, 2016

(65) Prior Publication Data

US 2017/0162078 A1 Jun. 8, 2017

Related U.S. Application Data

(60) Provisional application No. 62/264,131, filed on Dec. 7, 2015.

(51) Int. Cl.
*G09B 23/30* (2006.01)

(52) U.S. Cl.
CPC .................................. *G09B 23/30* (2013.01)

(58) Field of Classification Search
CPC ....................................................... G09B 23/30
See application file for complete search history.

(56) References Cited

U.S. PATENT DOCUMENTS

| | | | |
|---|---|---|---|
| 5,967,790 A * | 10/1999 | Strover | G09B 23/30 434/267 |
| 6,361,729 B1 * | 3/2002 | Strover | G09B 23/285 264/247 |
| 7,227,981 B1 | 6/2007 | Fleute et al. | |
| 7,715,602 B2 | 5/2010 | Richard | |
| 8,512,346 B2 | 8/2013 | Couture | |
| 9,017,335 B2 | 4/2015 | Stiehl | |
| 2005/0021043 A1 | 1/2005 | Jansen et al. | |
| 2005/0101966 A1 | 5/2005 | Lavallee | |
| 2005/0119661 A1 * | 6/2005 | Hodgson | A61B 17/155 606/90 |
| 2011/0118878 A1 * | 5/2011 | White | G09B 23/32 700/275 |
| 2014/0260701 A1 | 9/2014 | Imhauser | |

(Continued)

OTHER PUBLICATIONS

Blankevoort, L, et al., Validation of a Three-Dimensional Model of the Knee, J. Biomechanics, 1996, pp. 955-961, vol. 29, No. 7, Elsevier Science Ltd., Great Britain.

(Continued)

*Primary Examiner* — Corbett B Coburn
(74) *Attorney, Agent, or Firm* — Kim Winston LLP

(57) ABSTRACT

The present invention provides a method for creating a computer model of a patient specific joint for treatment planning. The method includes identifying a ligament of a joint of a patient under a load at a predefined position of the joint. The method further includes constructing, with the use of a computer, a computer model of the joint of the patient having: a first bone model, a second bone model, and a ligament model connecting the first and second bone models corresponding to the identified ligament, wherein the ligament model is constructed as at least one fiber based on a predefined slack length.

18 Claims, 21 Drawing Sheets

(56) References Cited

U.S. PATENT DOCUMENTS

2015/0250552 A1* 9/2015 Radermacher ............ A61F 2/46 703/11
2017/0258598 A1* 9/2017 Radermacher ......... G16H 50/50
2018/0033338 A1* 2/2018 Iannotti .................. G09B 23/30

OTHER PUBLICATIONS

Bertozzi, Luigi, et al., Knee Model Sensitivity to Cruciate Ligaments Parameters: A Stability Simulation Study for a Living Subject, Journal of Biomechanics, 2007, pp. S38-S44, vol. 40, Elsevier Ltd.

Blankevoort, L, et al., Ligament-Bone Interaction in a Three-Dimensional Model of the Knee, Journal of Biomechanical Engineering, 1991, pp. 263-269, vol. 113, ASME.

Yang, Zhaochun, et al., Development of a Subject-Specific Model to Predict the Forces in the Knee Ligaments at High Flexion Angles, Med Biol Eng Comput, 2010, Springer.

Guess, Trent M., et al., Evaluation of Knee Ligament Mechanics Using Computational Models, The Journal of Knee Surgery, 2015, Thieme Medical Publishers, Inc., New York, USA.

Bloemker, Katherine H., et al., Computational Knee Ligament Modeling Using Experimentally Determined Zero-Load Lengths, The Open Biomedical Engineering Journal, 2012, pp. 33-41, vol. 6, Bentham Open.

Moglo, K.E., et al., Cruciate Coupling and Screw-Home Mechanism in Passive Knee Joint During Extension-Flexion, Journal of Biomechanics, 2005, pp. 1075-1083, vol. 38, Elsevier Ltd.

Mootanah, R. et al., Development and Validation of a Computational Model of the Knee Joint for the Evaluation of Surgical Treatments for Osteoarthritis, Computer Methods in Biomechanics and Biomedical Engineering, 2014, Taylor & Francis.

Shelburne, Kevin B., et al., Pattern of Anterior Cruciate Ligament Force in Normal Walking, Journal of Biomechanics, 2004, pp. 797-805, vol. 37, Elsevier Ltd.

Shin, Choongsoo S., et al., The Influence of Deceleration Forces on ACL Strain During Single-Leg Landing: A Simulation Study, Journal of Biomechanics, 2007, pp. 1145-1152, vol. 40, Elsevier Ltd.

Thelen, Darryl G. et al., Co-Simulation of Neuromuscular Dynamics and Knee Mechanics During Human Walking, Journal of Biomechanical Engineering, 2014, vol. 136, ASME.

Smith, Colin R. et al., Influence of Ligament Properties on Tibiofemoral Mechanics in Walking, The Journal of Knee Surgery, 2015, Thieme Medical Publishers, Inc., New York, USA.

Wismans, J. et al., A Three-Dimensional Mathematical Model of the Knee-Joint, J. Biomechanics, 1980, pp. 677-685, vol. 13, Pergamon Press Ltd., Great Britain.

Kia et al., A Multibody Knee Model Corroborates Subject-Specific Experimental Measurements of Low Ligament Forces and Kinematic Coupling During Passive Flexion, Journal of Biomechanical Engineering, vol. 138, May 2016, U.S.

Moglo K.E. and Shirazi Adl. A., Cruciate coupling and screw-home mechanism in passive knee joint during extension-flexion, Journal of Biomechanics, vol. 38, pp. 1075-1083, 2005, U.S.

Rahr, et al., Increased Risk of Revision After Anteromedial Compared with Transtibial Drilling of the Femoral Tunnel During Primary Anterior Cruciate Ligament Reconstruction: Results from the Danish Knee Ligament Reconstruction Register, Arthroscopy: The Journal of Arthroscopic and Related Surgery, vol. 29, No. 1, pp. 98-105, Jan. 2013, U.S.

McCullough, et al., Return to High School- and College-Level Football After Anterior Cruciate Ligament Reconstruction: A Multicenter Orthopaedic Outvomes Network (MOON) Cohort Study, The American Journal of Sports Medicine, vol. 40, No. 11, Oct. 31, 2012, U.S.

* cited by examiner

METHOD FOR CREATING A COMPUTER MODEL OF A JOINT FOR TREATMENT PLANNING

CROSS REFERENCE TO RELATED APPLICATIONS

This application claims the benefit of U.S. Provisional Application No. 62/264,131, filed Dec. 7, 2015, the entire disclosure of which is incorporated by reference herein in its entirety.

BACKGROUND OF THE INVENTION

The present invention relates generally to a computational computer model of a joint. In particular, the present invention relates to a computer model of a patient specific joint for treatment planning and a method of developing a treatment plan and treating a joint of a patient.

There is wide population variability in the morphology and material properties of bones, articulating surfaces and ligaments of a joint. For example, in a knee joint, lateral tibial slope ranges up to 12° and varies by 50% as well as variations in femoral notch and medial compartment depth. Similarly, material properties of the anterior cruciate ligament ("ACL") can vary by up to 77%. Consequently, there are large variations in passive knee stability.

Accounting for this variability in a joint is an important consideration for planning surgical treatments, e.g. ACL reconstruction in a knee, and total or unicondylar knee arthroplasty (UKA). In ACL reconstruction, surgeons strive to restore knee function including knee kinematics and forces in the graft and surrounding tissues by choosing the most appropriate surgical parameters, such as graft size, type, and tunnel location for each patient. Not only must the surgeon contend with high patient-to-patient variations described above, they must also consider the status of surrounding soft tissues that may have been injured.

The failure to individually customize surgical parameters based on the unique structural and morphological profile of each patient also plays a role in suboptimal outcomes following e.g., ACL reconstruction. Such issues may result in the reported 5% failure rate of knee joint anterior cruciate ligament reconstructions, inability to return to sports, and long-term prognosis for joint degeneration.

BRIEF SUMMARY OF THE INVENTION

In accordance with exemplary embodiments, the present invention addresses the limitations and inadequacies of conventional computer models of joints by engendering a computational computer model of a joint having a ligament assembly constructed out of a unique set of fiber(s) having a predefined slack length.

In accordance with an exemplary embodiment, the present invention provides a method for creating a computer model of a patient specific joint for treatment planning. The method includes identifying a ligament of a joint of a patient under a load at full extension, and constructing, with the use of a computer, a computer model of the joint of the patient. The computer model includes a first bone model, a second bone model, and a ligament model connecting the first and second bone models corresponding to the identified ligament. The ligament model is constructed as at least one fiber based on a predefined slack length.

The predefined slack length is determined by the following objective function $$\min \sum_{i=1}^{y} \left( \left| \sum_{j=1}^{a_i} F_{i,j}^m(l, \dot{l}, l_0) \right| - F_i^e \right)^4$$

wherein y is a number of ligament models, $a_i$ is a number of fibers for the ligament model, $F_i^e$ is a predetermined load or force carried by the identified ligament at full extension, $l_0$ is a slack length of the ligament, $l_e$ is a fiber length at full extension for each fiber, and $F_{i,j}^m$ is a force of a fiber of the at least one fiber of the ligament model at full extension determined by the following Equation 1:

$$F(l, \dot{l}, l_0) = \qquad (1)$$
$$\frac{1}{n}\{[f^*(l) + c_d \dot{l} B_1] B_2 + [K(l - (l_0 + \Delta_t)) + f^*(l_0 + \Delta_t) + c_d \dot{l} B_1] B_3\}$$
$$B_1 = \text{step}(\dot{l}, 0, 0, \dot{l} + 0.1, 1)$$
$$B_2 = \text{step}(l, l_0, 0, l_0 + 0.1, 1) \times$$
$$\text{step}(l, (l_0 + \Delta_t), 1, (l_0 + \Delta_t) + 0.001, 0)$$
$$B_3 = \text{step}(l, (l_0 + \Delta_t), 0, (l_0 + \Delta_t) + 0.001, 1)$$

wherein, n is the number of fibers, l is the inter-insertional distance, $\dot{l}$ is the first derivative of the inter-insertional distance with respect to time, f*(l) is a cubic spline of a ligament force-elongation response in a toe region, K represents a linear portion of a force-elongation response, $\Delta_t$ is a transition between the toe region and the linear region, $B_{1,2,3}$ are step functions, and $c_d$ is a damping term constant.

The method further comprises determining a load for the identified ligament, wherein the predefined slack length is based on the determined target load, and/or determining a length of the at least one fiber at full extension, wherein the predefined slack length is based on the determined length of the at least one fiber at full extension.

The method further comprises outputting on a display operatively connected to the computer forces predicted by the computer model of the joint as it simulates a range of motion, and/or outputting on a display operatively connected to the computer kinematic motion predicted by the computer model of the joint as it simulates a range of motion. The forces predicted by the computer model of the joint is a ligament load on the ligament model, a contact force between the first and second bone models, or a directional force of movement of one of the first and second bone models relative to the other of the first and second bone models.

The method further comprises wherein the computer model further includes a menisci, and wherein the forces predicted by the computer model of the joint is a contact force on the menisci or a contact force between the menisci and at least one of the first and second bone models.

The computer model of the joint is a knee joint, an ankle joint, a hip joint, an elbow joint, a wrist joint, a finger joint, toe joint, patellofemoral joint, or a shoulder joint. When the computer model of the joint is a knee joint, the ligament model is a model of an anterior cruciate ligament, a posterior cruciate ligament, a superficial medial collateral ligament, a posterior oblique ligament, a medial posterior capsule, a lateral posterior capsule ligament, a lateral collateral ligament, an anterolateral ligament, a fabellofibular ligament, a coronary ligament, or a lateral coronary ligament. The ligament model can also include a predetermined linear or non-linear stiffness.

The method further comprises acquiring at least one of image data and geometric data of the joint of the patient, and wherein constructing the computer model of the joint is based on the acquired at least one of image data and geometric data.

Alternatively, instead of the identifying a ligament of a joint of a patient under a load at full extension of the joint, the method can include identifying a ligament of a joint of a patient under a load at a predefined position of the joint. The remaining steps of the method accordingly apply to the predefined position of the joint instead of at the full extension position. The predefined position of the joint includes, e.g., the position of full extension of the joint.

In accordance with another exemplary embodiment, the present invention provides a method of developing a treatment plan for treating a joint of a patient. The method includes identifying at least one ligament of a joint of a patient carrying a load at full extension of the joint; constructing, with the use of a computer, a computer model of the joint of the patient having ligament models corresponding to the identified at least one ligament, wherein each of the ligament models is constructed as at least one fiber based on a predefined slack length; outputting on a display operatively connected to the computer at least one of forces and motions predicted by the computer model of the joint as it simulates a range of motion; and developing a treatment plan for surgically treating the joint based on the at least one of forces and motions predicted by the computer model.

The method further comprises acquiring image data of the joint of the patient, wherein constructing the computer model of the joint is based on the acquired image data, and/or treating the patient based on the developed treatment plan.

The predefined slack length is determined by the following objective function $$\min \sum_{i=1}^{y} \left( \left| \sum_{j=1}^{a_i} F_{i,j}^m(l, \dot{l}, l_0) \right| - F_i^e \right)^4$$

wherein y is a number of ligament models, $a_i$ is a number of fibers for each ligament model, $F_i^e$ is predetermined load or force carried by each identified ligament at full extension, $l_0$ is a slack length at the ligament, $l_e$ is a fiber length at full extension for each fiber, and $F_{i,j}^m$ is a force carried by a fiber of the at least one fiber at full extension determined by the following Equation 1:

$$F(l, \dot{l}, l_0) = \qquad (1)$$
$$\frac{1}{n} \{ [f^*(l) + c_d \dot{l} B_1] B_2 + [K(l - (l_0 + \Delta_t)) + f^*(l_0 + \Delta_t) + c_d \dot{l} B_1] B_3 \}$$
$$B_1 = \text{step}(\dot{l}, 0, 0, \dot{l} + 0.1, 1)$$
$$B_2 = \text{step}(l, l_0, 0, l_0 + 0.1, 1) \times$$
$$\qquad \text{step}(l, (l_0 + \Delta_t), 1, (l_0 + \Delta_t) + 0.001, 0)$$
$$B_3 = \text{step}(l, (l_0 + \Delta_t), 0, (l_0 + \Delta_t) + 0.001, 1)$$

wherein, n is the number of fibers, l is the inter-insertional distance, $\dot{l}$ is the first derivative of the inter-insertional distance with respect to time, f*(l) is a cubic spline of a ligament force-elongation response in a toe region, K represents a linear portion of a force-elongation response, $\Delta_t$ is a transition between the toe region and the linear region, $B_{1,2,3}$ are step functions, and $c_d$ is a damping term constant.

The method further comprises determining loads carried by the identified at least one ligament, determining target loads for the identified at least one ligament, and determining lengths of the at least one fiber, and wherein the predefined slack length is based on the determined load, the determined target load of the at least one ligament, and the determined length of the at least one fiber.

Alternatively, instead of the identifying a ligament of a joint of a patient carrying a load at full extension of the joint, the method can include identifying a ligament of a joint of a patient carrying a load at a predefined position of the joint. The remaining steps of the method accordingly apply to the predefined position of the joint instead of at the full extension position. The predefined position of the joint includes, e.g., the position of full extension of the joint.

In accordance with yet another exemplary embodiment, the present invention provides an apparatus comprising a processor, a display, and a non-transitory computer-readable medium that includes computer instructions executable by the processor to: receive an identification of at least one ligament of a joint of a patient under a load at full extension; create a computer model of a patient specific joint that includes: a first bone model, a second bone model, and a ligament assembly model constraining the first and second bone models, wherein the ligament assembly model includes ligaments corresponding to the identification of at least one ligament each constructed as at least one fiber having a predefined slack length; simulate a range of motion of the computer model to determine at least one of forces and motions predicted as the joint travels through the range of motion; and output on the display the computer model of the joint and the predicted at least one of forces and motions of the joint generated by the computer model.

The processor can further execute computer instructions to receive image data of the joint of the patient, and to create the computer model based on the image data and/or to output on the display kinematic motion data of the first and second bone models as they travel through a range of motion.

The apparatus further includes computer instructions executable by the processor to determine the predefined slack length based on the following objective function $$\min \sum_{i=1}^{y} \left( \left| \sum_{j=1}^{a_i} F_{i,j}^m(l, \dot{l}, l_0) \right| - F_i^e \right)^4$$

wherein y is a number of ligaments of the ligament assembly model, $a_i$ is a number of fibers for each ligament of the ligament assembly model, $F_i^e$ is a predetermined load or force carried by each identified ligament at the predefined position, $l_0$ is a slack length of the ligament, $l_e$ is a fiber length at the predefined position for each fiber, and $F_{i,j}^m$ is a force carried by a fiber of the at least one fiber at full extension determined by the following Equation 1:

$$F(l, \dot{l}, l_0) = \qquad (1)$$
$$\frac{1}{n} \{ [f^*(l) + c_d \dot{l} B_1] B_2 + [K(l - (l_0 + \Delta_t)) + f^*(l_0 + \Delta_t) + c_d \dot{l} B_1] B_3 \}$$
$$B_1 = \text{step}(\dot{l}, 0, 0, \dot{l} + 0.1, 1)$$
$$B_2 = \text{step}(l, l_0, 0, l_0 + 0.1, 1) \times$$

-continued $$B_3 = \text{step}(l, (l_0 + \Delta_t), 1, (l_0 + \Delta_t) + 0.001, 0) \\ \text{step}(l, (l_0 + \Delta_t), 0, (l_0 + \Delta_t) + 0.001, 1)$$

wherein, n is the number of fibers, l is the inter-insertional distance, $\dot{l}$ is the first derivative of the inter-insertional distance with respect to time, f*(l) is a cubic spline of a ligament force-elongation response in a toe region, K represents a linear portion of a force-elongation response, $\Delta_t$ is a transition between the toe region and the linear region, $B_{1,2,3}$ are step functions, and $c_d$ is a damping term constant.

Alternatively, instead of computer instructions executable by the processor to receive an identification of at least one ligament of a joint of a patient carrying a load at full extension of the joint, the apparatus can include computer instructions executable by the processor to receive an identification of at least one ligament of a joint of a patient carrying a load at a predefined position of the joint. The remaining executable computer instructions accordingly apply to the predefined position of the joint instead of at the full extension position. The predefined position of the joint includes, e.g., the position of full extension of the joint.

BRIEF DESCRIPTION OF THE SEVERAL VIEWS OF THE DRAWINGS

The foregoing summary, as well as the following detailed description of the exemplary embodiments of the invention, will be better understood when read in conjunction with the appended drawings. For the purpose of illustrating the invention, there are shown in the drawings exemplary embodiments. It should be understood, however, that the invention is not limited to the precise arrangements and instrumentalities shown.

In the drawings:

FIGS. 11A-11F are representations of major ligament fibers in a multi-body computer model of a knee joint in accordance with an exemplary embodiment of the present invention wherein FIG. 11A illustrates and ACL having 6 fibers, FIG. 11B illustrates a PCL having 6 fibers, FIG. 11C illustrates an sMCL having 3 proximal fibers and 3 distal fibers, and a POL having 3 fibers, FIG. 11D illustrates a MPC and a LPC each having 3 fibers, FIG. 11E illustrates an OPL having 2 fibers, and FIG. 11F illustrates a FFL having 1 fiber, an LCL having 1 fiber, and an ALL having 1 fiber;

FIG. 15A is a graph of the ACL load, FIG. 15B a graph of the PCL load, FIG. 15C a graph of the sMCL load, FIG. 15D is a graph of the LCL load, and FIG. 15E is a graph of the POL load;

FIG. 16A is a graph of the internal rotation of the computer model, FIG. 16B is a graph of the anterior translation of the computer model, FIG. 16C is a graph of the distal translation of the computer model, FIG. 16D is a graph of the varus rotation of the computer model, and FIG. 16E is a graph of the lateral translation across the passive flexion path from 0 to 130° of the computer model;

DETAILED DESCRIPTION OF THE INVENTION

Figure 1:
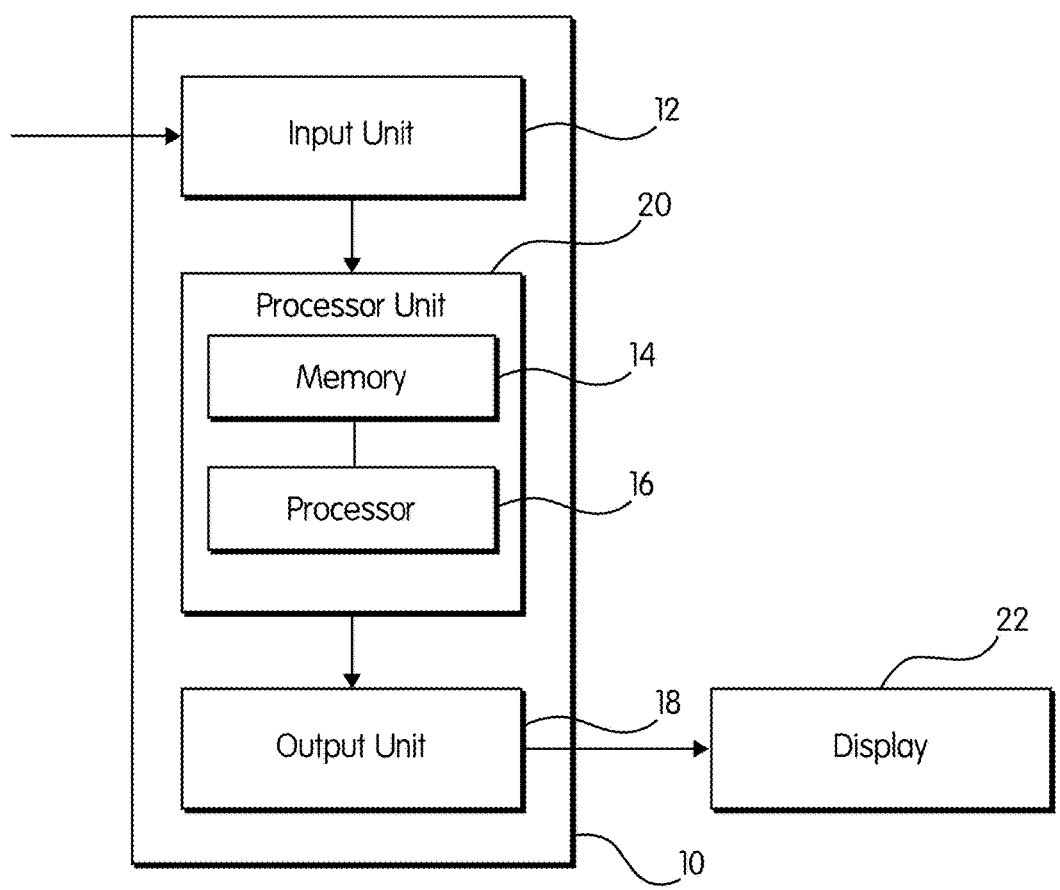
FIG. 1 is a schematic view of a computer applicable for use in accordance with embodiments of the present invention.

Reference will now be made in detail to the exemplary embodiments of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the embodiments of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Technical Problem of Conventional Computer Models of a Joint

Currently there are numerous surgical techniques available to treat joint related issues or injuries of a patient. These techniques are applicable to a wide variety of joints of a patient, such as the knee, ankle, hip, shoulder, elbow, fingers, wrists, and other synovial joints. Such techniques include, but are not limited to, ligament reconstruction and joint replacement.

However, not all joints of individuals of a population function in exactly the same manner and there are large variations in, e.g., morphology, material properties of bones, articulating surfaces and ligaments, in joints between different individuals. Accounting for these variations is an important consideration for planning surgical treatments of such joints. The failure to individually customize surgical parameters based on unique structural and morphological profile of each patient results in suboptimal outcomes. Studies have shown, e.g., a 5% failure rate of anterior cruciate ligament (ACL) reconstructions, an inability to return to sports, and long-term prognosis for joint degeneration. See Rahr-Wagner, L. et al. "Increased Risk of Revision After Anteromedial Compared With Transtibial Drilling of the Femoral Tunnel During Primary Anterior Cruciate Ligament Reconstruction: Results from the Danish Knee Ligament Reconstruction Register", The Journal of Arthroscopic and Related Surgery, Vo. 29, No. 1 (January) 2013, pp 98-105; and McCullough, K. A., et al., "Return to High School- and College-Level Football After Anterior Cruciate Ligament Reconstruction, A Multicenter Orthopaedic Outcomes Network (MOON) Cohort Study," The American Journal of Sports Medicine, Vol. 40, No. 11, the entire disclosures of which are hereby incorporated by reference in their entirety for all purposes.

For example, in uni-condylar knee arthroplasty (UKA), its ability to restore native knee kinematics and ligament load is not well understood. Proper alignment of UKA components is critical to avoid complications including increased polyethylene wear and abnormal joint mechanics. However, the effect of implant alignment on knee function may not be the same from patient-to-patient due to high variations in the morphology of the bones, articular surfaces, and ligaments.

Passive knee flexion is guided by the interaction of the articulating cartilage surfaces, ligaments, and menisci. Together these structures provide a large range of flexion/extension and allow subtle coupled motions. Treating knee injury or joint degeneration with ligament reconstruction or joint replacement, respectively, relies on generating loading patterns in the reconstructed or remaining passive restraints that allow passive flexion with minimal resistance. As such, surgeons evaluate the range of flexion as a critical peri- and intra-operative assessment of knee function. Failure to restore loading patterns in the passive restraints can result in clinical complications that contribute to joint degeneration following ligament reconstruction or abnormal kinematics following joint replacement. See Victor, J., and Bellemans, J., 2006, Physiologic Kinematics as a Concept for Better Flexion in TKA," Clin. Orthop. Relat. Res., 452, pp. 53-58, and Shelbourne, K. D., Urch, E. R., Gray, T., and Freeman, H., 2012, "Loss of Normal Knee Motion After Anterior Cruciate Ligament Reconstruction Is Associated With Radiographic Arthritic Changes After Surgery," Am. J. Sports Med., 40(1), pp 1019-1031, the entire disclosures of which are hereby incorporated by reference in their entirety for all purposes.

Therefore, quantifying interdependencies among knee kinematics, ligament load, and the influence of implant alignment from patient-to-patient is important. This is currently attempted by computer models of the joint that provide a framework to assess the impact of surgical and patient factors on knee stability and ligament forces. However, conventional computer models of a joint are limited in their ability to predict kinematics and loading patterns in the passive restraints over a large range of flexion. That is, conventional computer models are hindered in their ability to predict kinematic and ligament loading patterns over a large range of flexion because they do not account for variables necessary to properly predict forces and motion between the bones of a joint. In sum, conventional computer models of a joint cannot adequately differentiate the wide range of passive knee stability and ligament loading patterns observed across a population.

Technical Solution

To address the deficiencies of conventional computer models of a joint as well as the conventional deficiencies in planning surgical treatment plans for treating joints, a new method of creating a computer model of a joint that is patient specific has been developed. The new method of creating the computer model of the patient specific joint includes identifying ligaments of a joint of the patient that are under a load at full extension of the joint. The identified ligaments are than incorporated into the computer model of the joint. The computer model of the joint is a multibody dynamic model that includes formulations for ligament fiber architecture that reflects its anatomy. Alternatively, the computer model of the joint can be a finite element model, a computational model, and the like.

Further, the identified ligaments are constructed based on a predefined slack length. The slack length is determined based on an objective function (as further discussed below) applied to the identified ligaments or fiber(s) that construct the ligament. "Slack length" is defined as the length of a ligament at which fibers of a ligament or the ligament begin to carry a load. "Full extension" is understood to be from hyperextension to about 15 degrees of flexion of the joint. For example, full extension can be from about −15 degrees of hyperextension to about 15 degrees of flexion.

Conventional computer models of a joint do not include modeling joints having ligaments under a load at full extension defined as a single fiber or a set of fibers having at least one fiber wherein at least one of the fibers includes a slack length. See K. E. Moglo, A. Shirazi-Adl, "Cruciate Coupling And Screw-Home Mechanism In Passive Knee Joint During Extension-Flexion," Journal of Biomechanics 38 (2005) 1075-1083. The present invention, however, advantageously includes ligaments that have been identified as having a load at full extension and constructed based on a predefined slack length to better predict forces on the joint as well as kinematic motion of the joint bones.

The computer model of the joint is then simulated through a range of motion i.e., equations of motion are applied to the computer model, to predict reaction forces and motion of the joint as it moves through the range of motion.

Alternatively, the computer model can be created with ligaments of a joint identified as having a load or carrying a load at a defined position, i.e., a predefined position. That is, a computer model of a joint is created with ligaments identified as having a load at a predefined position, such as at flexion, e.g., at 30, 35, 40, 45, 50, 55, 60, 65, 70, 75, 80, 85, 90, 95, and 100 degrees, or full extension or hyperextension, or rotational position of one bone relative to another bone, or translational position of one bone relative to another, e.g., anterior-posterior or medial-lateral translation.

The identified ligaments under a load at the predefined position are than incorporated into the computer model of the joint.

A further detailed discussion of how the computer model is created with identified ligaments based on a slack length is discussed below. The following discussion of exemplary embodiments of the present invention is discussed with respect to identifying ligaments carrying a load a full extension of the joint. However, the various exemplary embodiments can alternatively be applied to ligaments and to identifying ligaments carrying a load at a predefined position of the joint.

Computer System

Figure 2:
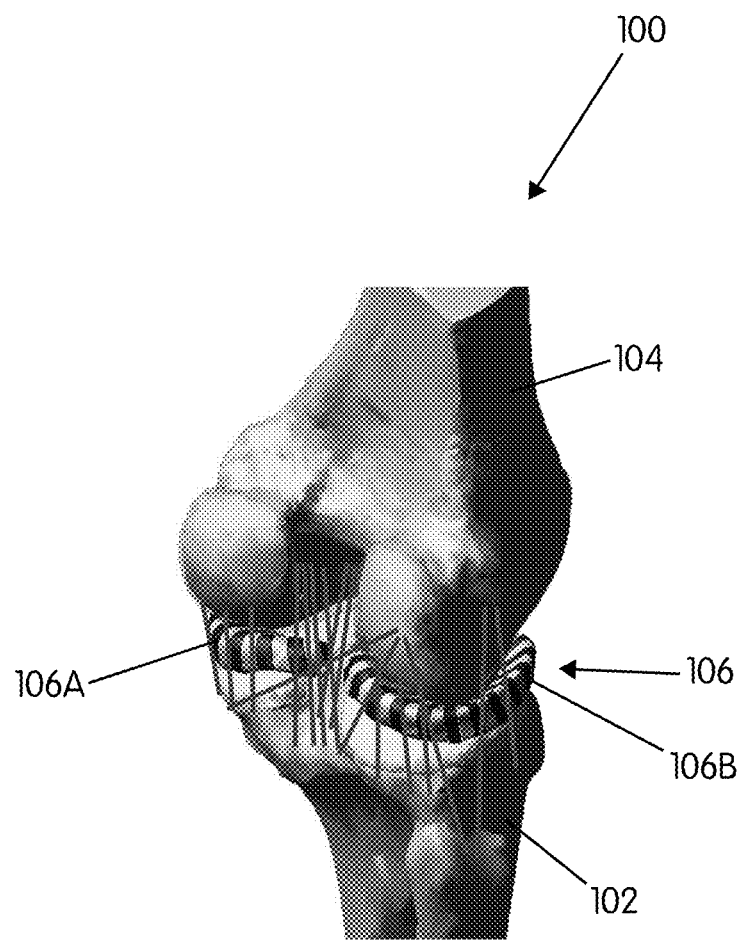
FIG. 2 is a perspective view of a computer model of an exemplary joint in accordance with an exemplary embodiment of the present invention.

FIG. 1 illustrates a schematic view of a computer 10 applicable to the present invention for creating a computer model 100 (FIG. 2),e.g., a computer model of a joint, also known as a computational computer model or three-dimensional ("3D") computer model, of a joint in accordance with the various embodiments of the present invention. The computer 10 includes an input 12, a memory 14, such as a non-transitory computer readable medium, a processor 16, and an output unit 18. The input unit 12 receives input data and user commands from any suitable interface. The memory 14 and the processor 16 together form a processor unit 20 that operates to perform calculations on the input data and to store the results of these calculations in the memory 14. The output unit 18 outputs the stored results through any suitable interface onto any suitable recording medium or display device, e.g., a display 22. In an exemplary example, the computer 10 is a general purpose computing platform, such as a desktop computer or server computer, as will be familiar to those skilled in the art.

In accordance with an exemplary embodiment, the computer 10 includes image processing software executable by the processor for importing medical images into the computer and creating 3D computer models of the images. The image processing software is used in the segmentation of 3D medical images, e.g., from CT, MRI, micro-CT, CBCT, 3D Ultrasound, and Confocal Microscopy, for creating highly accurate 3D models of patient specific anatomy. Image processing software applicable to the present invention, include but not limited to, Materialise Mimics® from Materialise of Belgium. The Materialise Mimics® software is hereby incorporated by reference herein in its entirety for all purposes. The image processing software can be stored on the computer's memory or remotely stored, and executable by the processor.

A ligament assembly model of the joint is also created using the image processing software. The computer model 100 of the joint is created with the ligament assembly model including specific points of attachment of the ligament to bone. Specific points of attachment of the ligaments can be identified through medical images of the joint. Each ligament is modeled as a fiber or a set of fibers. Further, each fiber is modeled as a one dimensional force element linking two bodies, e.g., first and second bone models of a joint model.

In accordance with an exemplary embodiment, the computer 10 also includes software executable by the processor for filtering features, e.g., smoothing surfaces geometries, of imported medical images. Such software applicable to the present invention include, but not limited to, Geomagic Studio from 3D Systems, Inc. of Rock Hill, S.C. The Geomagic Studio (2012 version) software is hereby incorporated by reference herein in its entirety for all purposes. The software can be stored on the computer's memory or remotely stored, and executable by the processor.

In accordance with an exemplary embodiment, the computer 10 further includes simulation software executable by the processor for creating the computer model of the joint 100. The software can be stored in the memory 14, or alternatively be stored on a remote sever, e.g., a cloud based system, or operating system, in communication with the computer for executing the software to create the computer model. The software stored for creating the computer model 100 in accordance with an exemplary embodiment is the ADAMS® multidynamic software from MSC Software Corporation of Newport Beach, Calif., also commonly known as the Multibody Dynamics Simulation Solution. The entire Adams 2016 software and disclosure is hereby incorporated by reference in its entirety for all purposes. Alternatively, other conventional or later developed multidynamic software capable of constructing a computer model of a joint in accordance with the present invention can also be used with the computer 10. The simulation software creates the computer model of the joint using the 3D computer models of the joint anatomy based on the imported medical images and/or as further developed, including the ligament assembly.

The computer 10 includes computer instructions stored in memory or otherwise accessible by the processor, executable to determine slack length of ligaments identified as having a load at full extension of a joint. The computer instructions are executable to determine slack length $l_0$ of the identified ligaments based on the following equation, i.e., objective function E1:

$$\min \sum_{i=1}^{y} \left( \left| \sum_{j=1}^{a_i} F_{i,j}^m(l, l, l_0) \right| - F_i^e \right)^4$$

wherein y is a number of ligament models, $a_i$ is a number of fibers for each ligament, and $F_i^e$ is a predetermined load or force carried by the ligament at full extension of the joint. $l_0$ is slack length. $l_0$ is preferably defined as $l_0 = l_e (100-x)$ % where $-10 \le x \le +10$. $l_e$ is a fiber length for each fiber of a ligament of the patient when the joint is at full extension.

$F_{i,j}^m$ is a force carried by a single ligament fiber of a given ligament at full extension. In the objective function E1, i represents a given ligament of the ligaments 1-y, and j represents a given fiber of the fibers j-$a_i$ of a given ligament i.

$F_{i,j}^m$ is determined by the following equations:

$$F(l, \dot{l}, l_0) = \frac{1}{n} \{ [f^*(l) + c_d \dot{l} B_1] B_2 + [K(l - (l_0 + \Delta_t)) + f^*(l_0 + \Delta_t) + c_d \dot{l} B_1] B_3 \}$$

$$B_1 = \text{step}(\dot{l}, 0, 0, \dot{l} + 0.1, 1)$$

$$B_2 = \text{step}(l, l_0, 0, l_0 + 0.1, 1) \times \text{step}(l, (l_0 + \Delta_t), 1, (l_0 + \Delta_t) + 0.001, 0)$$

$$B_3 = \text{step}(l, (l_0 + \Delta_t), 0, (l_0 + \Delta_t) + 0.001, 1)$$

wherein, n is a number of fibers of a ligament, l is an inter-insertional distance, $\dot{l}$ is a first derivative of the inter-insertional distance with respect to time, $l_0$ is a ligament slack length, $f^*(l)$ is a parametric equation, e.g., a cubic spline, of a ligament load-displacement response in a toe region, K represents a linear portion of a force-elongation response, and $\Delta_t$ is a transition between the toe region and the linear region. $B_{1,2,3}$ are step functions. The term $c_d$ is a parallel damping term that is a constant for a particular ligament. The value of $c_d$ for each ligament can be determined based on reported values in the literature, or experimentally determined based on individual viscoelastic testing of ligaments.

The surgeon can determine a length of a fiber for each ligament at full extension based on a physical assessment of each ligament. Alternatively, use of medical imaging data can be used to determine a length of a ligament or a length of a fiber of each ligament at full extension. These determined lengths of the ligament or fiber are then used to construct the computer model 100, as further discussed above and below.

$F_i^e$ is a target load for a ligament that is determined by the user or surgeon and used in the objection function E1. $F_i^e$ can be determined manually by the user or via instruments, as further discussed below.

The objection function E1 is applied to the one or more fibers of the ligaments of the computer model identified as having a load at full extension. Alternatively, the computer model can be configured to include all or some of the fibers of the identified ligaments in the objective function.

In sum, the computer 10 provides a tool for constructing, i.e., creating, the computer model of a joint 100 in accordance with the exemplary embodiments of the present invention.

Method for Creating a Computer Model of a Patient Specific Joint

Figure 3:
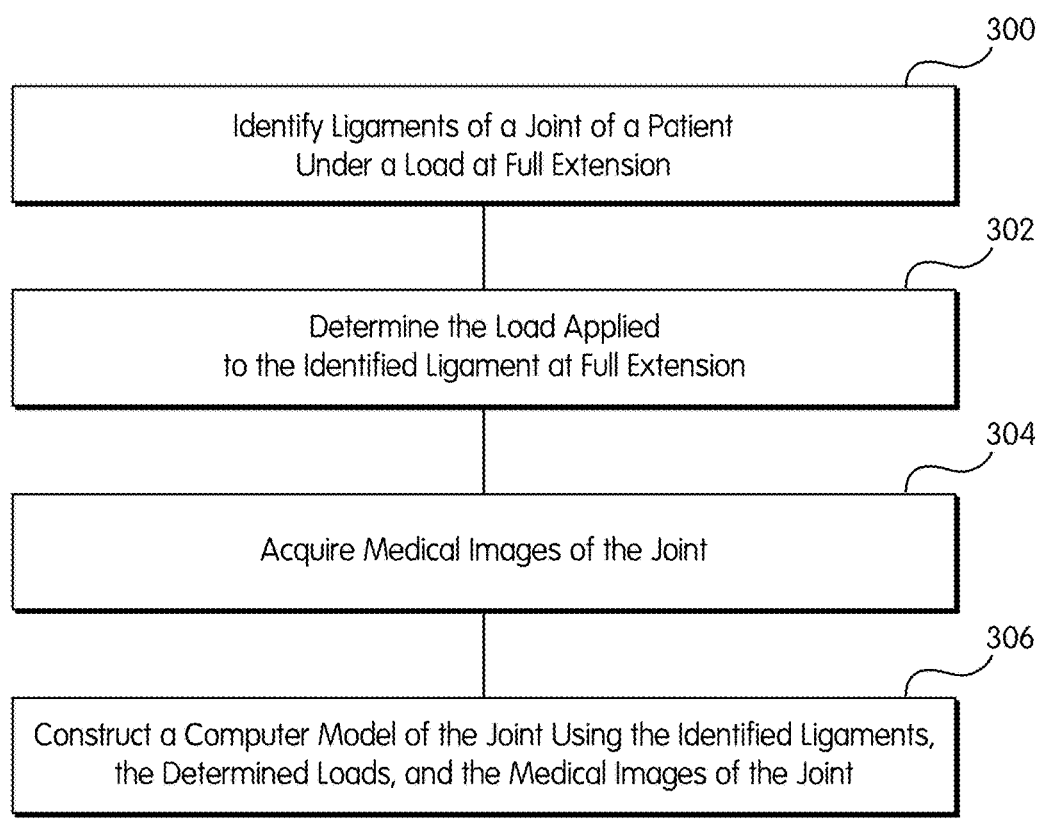
FIG. 3 is a flowchart of a method for creating a computer model of a patient specific joint.

FIG. 3 illustrates a flow chart of the method for creating the computer model 100 of a patient specific joint. The method includes identifying ligaments of a joint of a patient that are under a load at full extension (step 300). The joint can be any joint of the patient that is the target of treatment. For discussion purposes only, the foregoing exemplary discussion will be applied to a knee joint, but can alternatively be applied to other joints of a patient.

In an exemplary aspect, a surgeon or physician identifies ligaments of the knee that are under a load at full extension by physical examination of the knee. For example, the surgeon may physically locate and feel the ligament as he moves the knee through a full range of motion, e.g., from hyperextension to greater than 90 degrees flexion and up to 130 degrees flexion or further deep flexion. The surgeon can do this for each ligament and then move to a next ligament to determine which ligaments are under a load at full extension, e.g., from about −15 degrees of hyperextension to about 15 degrees flexion. This technique can be done for each ligament of the knee, such as the anterior cruciate ligament (ACL), posterior cruciate ligament (PCL), medial and lateral posterior capsule (MPC) and (LPC), oblique popliteal ligament (OPL), fabellofibular ligament (FFL), lateral collateral ligament (LCL), anterolateral ligament (ALL), posterior oblique ligament (POL), superficial medial collateral ligament (sMCL), and lateral and medial coronary ligaments (LM) and (MM).

The surgeon then determines based on the physical assessment of each ligament a load applied to the ligament at full extension (step 302). The determined ligament loads at full extension are then used to construct the computer model 100 of the joint, as further discussed below.

In accordance with another exemplary aspect, the surgeon can identify ligaments of the knee that are under a load at full extension via medical imaging data, such as computed tomography (CT) scans, X-rays, magnetic resonance imaging (MRI) and the like. This can be accomplished, e.g., by comparing images of ligaments taken at various flexion angles of the knee or by images of the knee at full extension alone. Ligament loads at full extension can also be determined by analysis of the medical images of each ligament.

Figure 4:
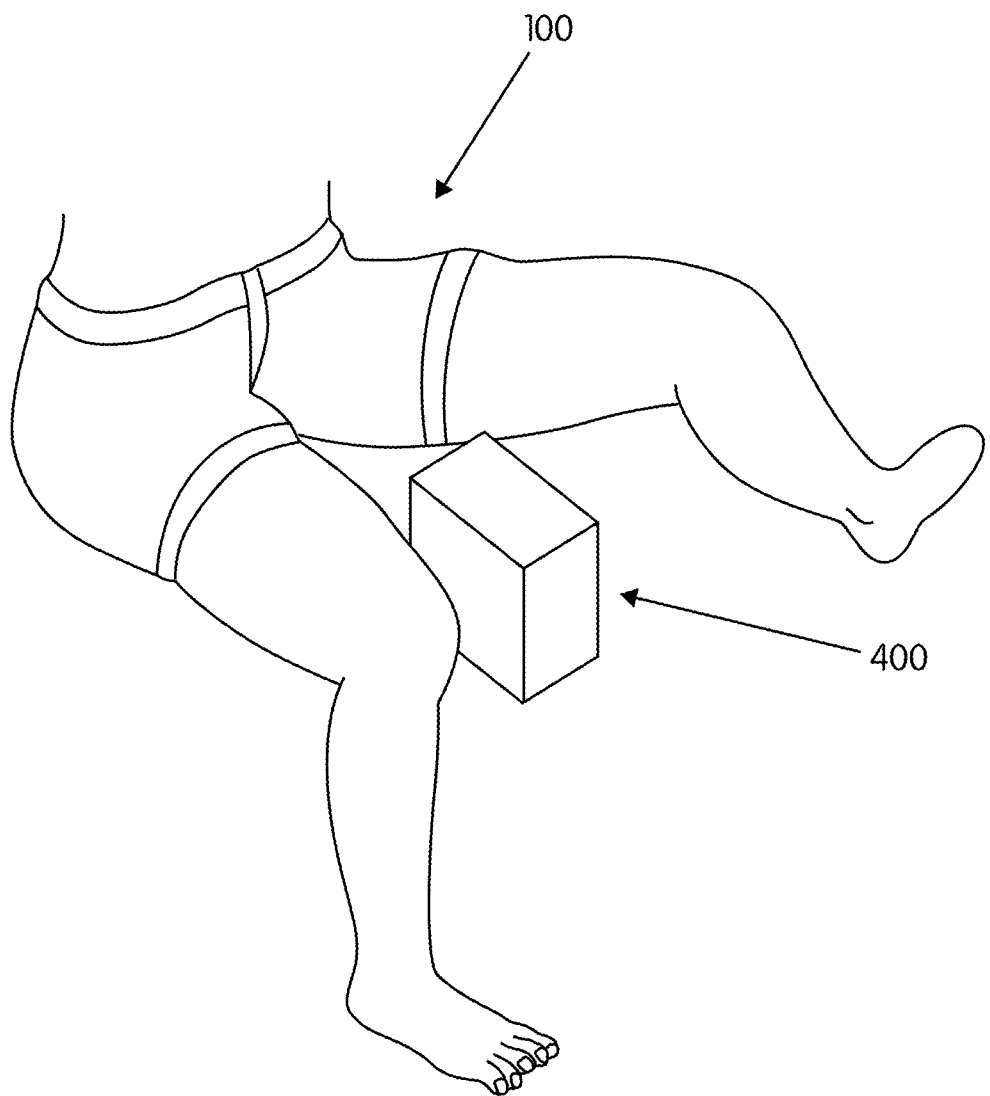
FIG. 4 is a schematic view of a physical testing apparatus for use in identifying ligaments in accordance with exemplary embodiments of the present invention.

In accordance with another exemplary aspect, the surgeon can identify ligaments of a joint of a patient 1000 that are under a load a full extension by a physical testing apparatus 400 (FIG. 4). The testing apparatus can be, e.g., an apparatus for determining a load displacement response of a joint.

Figure 5:
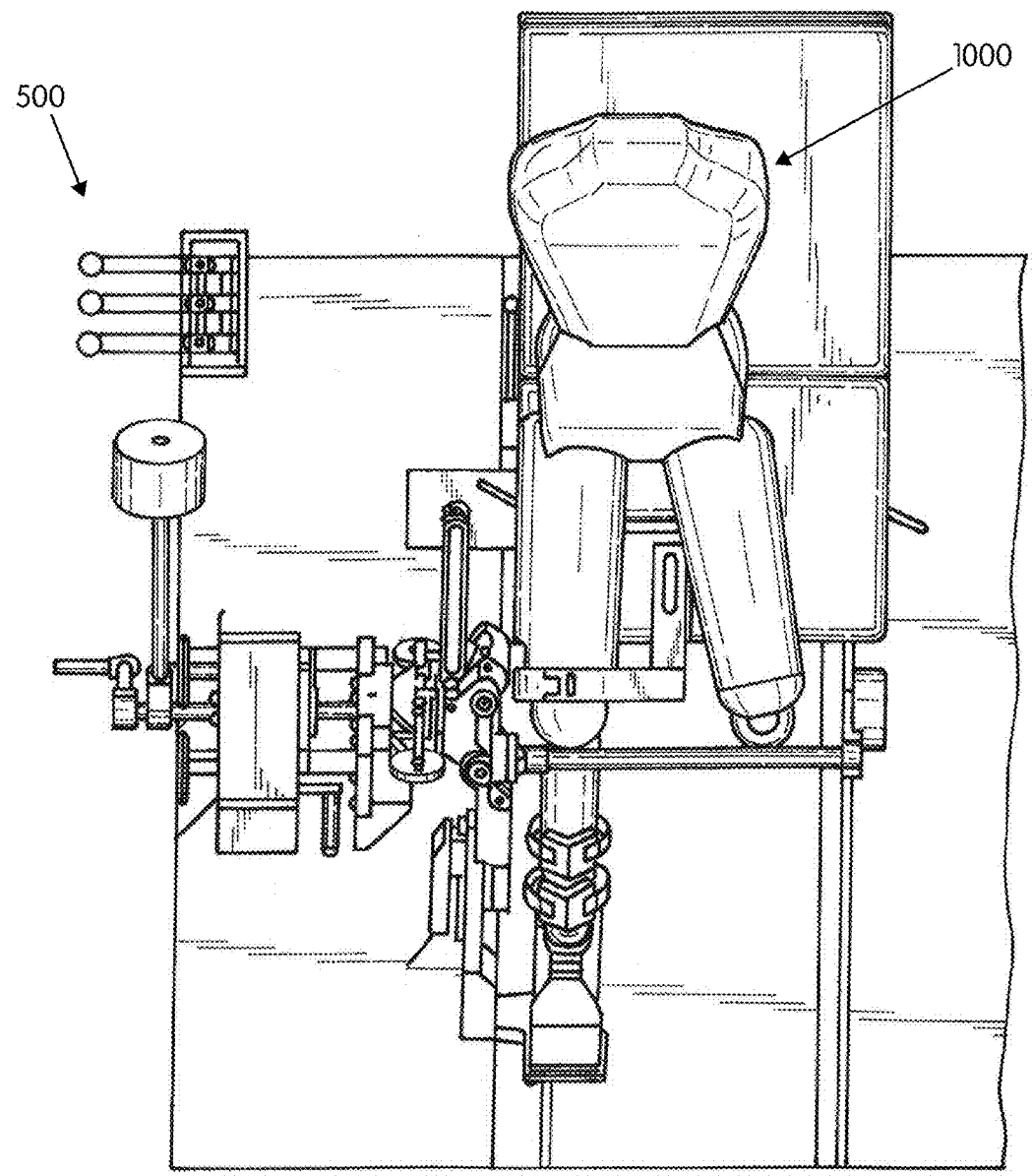
FIG. 5 is a perspective view of an exemplary physical testing apparatus for use in identifying ligaments in accordance with exemplary embodiments of the present invention.

FIG. 5 illustrates a testing apparatus 500 applicable for identifying ligaments of a knee joint of a patient 1000 that are under a load at full extension as well as determining the loads on each ligament at full extension. Details regarding the structure, function and operation of the testing apparatus 500 are disclosed in U.S. Patent Application Publication No. 2014/0260701, the entire disclosure of which is hereby incorporated by reference in its entirety for all purposes.

Images of the joint of the patient are obtained by, e.g., CT imaging, X-ray, and/or MRI imaging (step 304). Alternative imaging techniques applicable for acquiring image data suitable for creating a three-dimensional (3D) model of the joint can also be used in accordance with the present invention. For example, images of a joint can be taken by a CT scanner, such as a Siemens, Biograph mCT, of Germany, positioned in full extension, and scanned axially with a slice thickness of 0.625 mm and in-plane pixel dimensions of 0.6×0.6 mm$^2$. The obtained image data of the joint is then inputted into the computer 10 for creation of patient-specific joints using image processing software, such as Materialise Mimics®, along with ligament models of the joint that have been identified as being under a load at full extension (step 306).

Alternatively, the 3D models of the joint components can be created by acquiring geometric data of the joint components alone or in combination with image data of the joint components. This can be accomplished, e.g., by acquiring digitized points on the surface of the joint components and then creating the 3D models of the joint components based on the acquired digitized points using a computer aided surgical system or other applicable computer system. Computer systems, apparatuses and methods of acquiring such geometric data to create 3D models of joint components applicable to the present invention are disclosed in U.S. Pat. Nos. 8,512,346; 9,017,335; 7,227,981 and 7,715,602, and U.S. Patent Application Publication Nos.: 2005/0021043 and 20050101966, the entire disclosures of which are hereby incorporated by reference herein in their entirety for all purposes.

After receiving inputs of the identified ligaments of a joint under a load at full extension the computer 10 then determines a slack length $l_0$ for each identified ligament. The slack length $l_0$ is determined based on the objective function E1 discussed above.

A generalized reduced gradient optimization algorithm was utilized to determine the slack lengths ($l_a$) of the ligament fibers. An exemplary reduced gradient optimization algorithm applicable to the present embodiment is disclosed in Lasdon, L. S., Fox, R. J., and Margery, W., 1974, "Nonlinear optimization using the generalized reduced gradient method," RAIRO—Operations Research—Recherche Opérationnelle 3(8), pp. 73-103, the entire disclose of which is incorporated by reference herein for all purposes. Alternatively, other optimization algorithms suitable for the present invention can be utilized.

In constructing the computer model 100 of a particular joint, the computer 10 receives additional input data for constructing the joint. Specifically, the computer model 100 is constructed with one or more ligaments that are not under a load at full extension in addition to the ligaments identified as being under a load at full extension. These ligaments may correspond to each ligament that is already known to exist for a given joint. Each ligament is modeled to correspond to conventional understanding of how such ligaments are structured, e.g., size and length, and arranged, e.g., points of attachment to bone. In accordance with an exemplary embodiment, such ligaments not under a load at full extension are defined based on their computed longest length obtained from experimentally measured flexion paths.

Additionally, each ligament model of the computer model is defined as a single or a set of fibers. In other words, the ligament model includes at least one fiber that connects two bodies, e.g., first and second bone models of a computer model of a joint.

Preferably, when constructing ligaments for the ligaments identified as being under a load at full extension, each fiber is constructed based on a predefined slack length. However, the computer model can alternatively be configured such that at least one of the set of fibers is constructed based on the predefined slack length. For example, in an identified ligament defined as having seven fibers, one fiber is constructed as having a predefined slack length while the remaining six other fibers are not constructed with a predefined slack length.

In an exemplary embodiment of a computer model of a knee joint, the knee joint computer model e.g., 100 (FIG. 2) is constructed with a tibial bone model 102, a femoral bone model 104, and a ligament assembly model that includes an anterior cruciate ligament having six fibers constraining the femoral and tibial bones, a posterior cruciate ligament having seven fibers constraining the femoral and tibial bones, a superficial medial collateral ligament having six fibers constraining the femoral and tibial bones, a posterior oblique ligament having three fibers constraining the femoral and tibial bones, a medial posterior capsule ligament having three fibers constraining the femoral and tibial bones, a lateral posterior capsule ligament having three fibers constraining the femoral and tibial bones, a lateral collateral ligament having a single fiber constraining the femoral and tibial bones, an anterolateral ligament having a single fiber constraining the femoral and tibial bones, and a fabellofibular ligament having a single fiber constraining the femoral and tibial bones.

The knee joint model can further be constructed with a meniscus model 106 and a coronary ligament having seven fibers constraining a medial menisci 106A of the meniscus and the tibial bone, and a lateral coronary ligament having a single fiber constraining the lateral meniscus 106B of the meniscus to the tibial bone.

Simulation of the computer model of the joint as it moves through a range of motion provides reactive ligament forces, reactive forces on an meniscus, motions of the joint model, contact forces between bodies of the joint, e.g., between the tibia and femur bone models of a knee joint, and contact forces between the menisci and at least one of the tibial bone and femoral bone.

Alternatively, the computer model of the joint can be configured to include a menisci model of a joint, e.g., menisci 106 as applicable to a knee joint, or a plurality of menisci elements, e.g., a medial menisci 106A and a lateral menisci 106B applicable to a knee joint. Accordingly, simulation of the computer model of a joint that includes a menisci model provides contact forces on a menisci, or between the menisci model and at least one of the first and second bone models of the joint, or between menisci elements.

Method of Developing a Treatment Plan and Treating a Joint of a Patient

Figure 6:
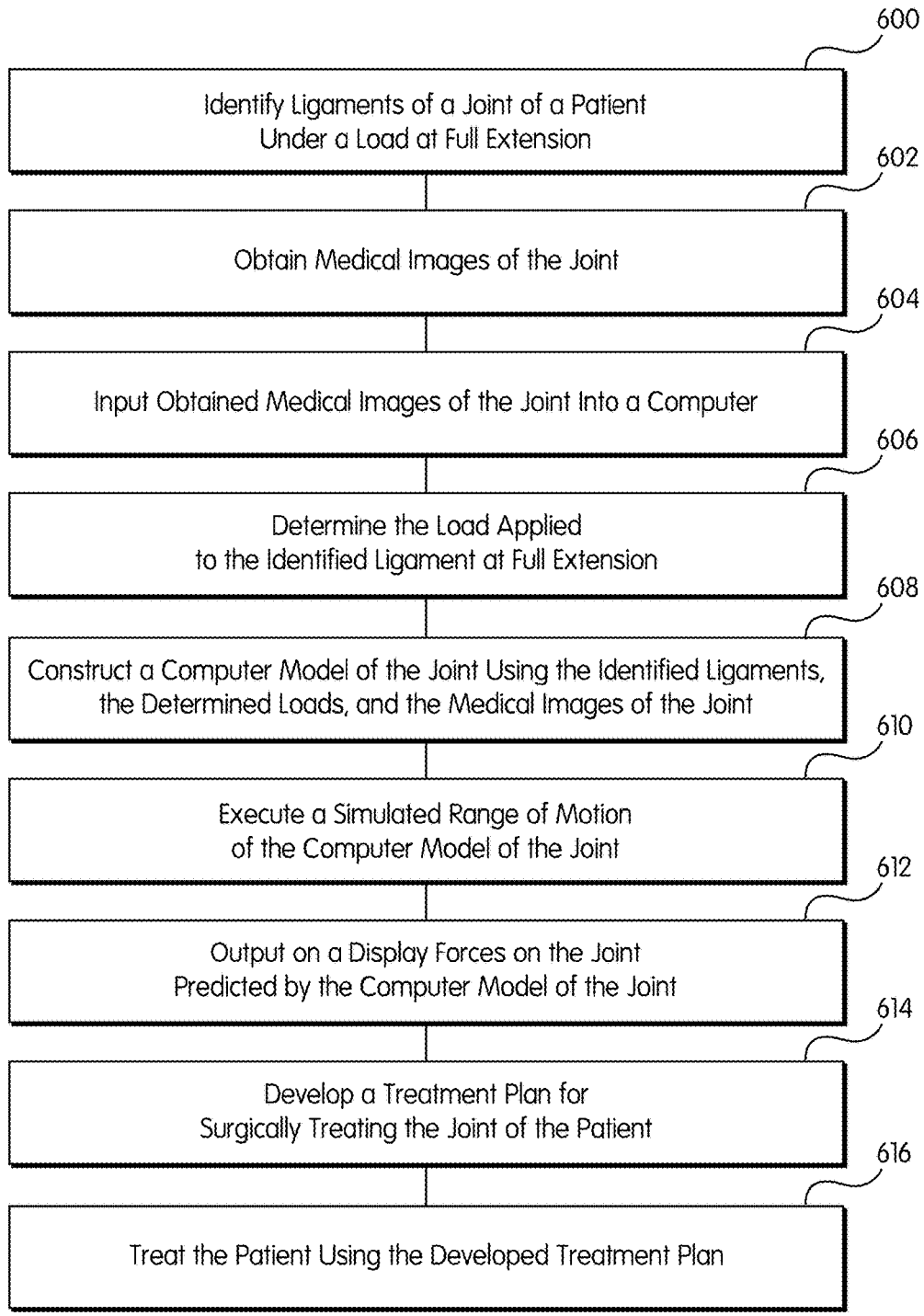
FIG. 6 is a flowchart of a method of developing a treatment plan and treating a patient in accordance with exemplary embodiments of the present invention.

FIG. 6 illustrates a flow chart of a method of developing a treatment plan and treating a joint of a patient in accordance with an exemplary embodiment of the present invention. The method includes identifying ligaments of a joint of a patient that are under a load a full extension (step 600) and obtaining image data, e.g., medical images, of the joint of the patient, or geometric data of the joint of the patient (step 602), as further discussed herein. The obtained image data and/or geometric data is inputted/loaded into the computer 10 for use in creating 3D models of the joint (step 604). Geometric data of a joint of patient can be obtained with a computer aided surgical system or computer system as described above. Depending on the type of joint, appropriate ligaments i.e., ligament models, are created for the computer model of the joint, includes ligaments identified as having a load at full extension. Such identified ligaments under a load at full extension is created as a set of fibers having at least one fiber based on a predefined slack length, as discussed above.

Loads applied to the identified ligaments at full extension are then determined (step 606). Then, a computer model of a joint is created using the obtained medical images, the identified ligaments, and the determined loads on the identified ligaments (step 608).

After the computer model of the joint is created, the computer model is simulated through a range of motion to predict reactive forces on the joint, such as ligament and contact forces, and reactive forces on the meniscus of the joint, as well as predicting kinematic motion of the bones of the joint (step 610).

The method further includes outputting via the output unit 18 to a display 22 operatively connected to the computer the predicted forces of the joint predicted by the computer model of the joint as it simulates a range of motion i.e. as it travels through a range of motion (step 612).

Thereafter, a treatment plan for surgically treating the joint of the patient is developed (step 614). The treatment plan can include, e.g., ligament reconstruction, including whether or not ligament reconstruction is necessary, use of additional grafts around the joint, placement of grafts and associated anchors, placement of joint component implants within the joint, as well as development of an activities, exercise or physical therapy plan for the patient.

After the treatment plan has been developed, the surgeon or physician performs a treatment or treats the joint of the patient in accordance with or based on the developed treatment plan (step 616).

For example, when the computer model is a model of the knee joint, the computer model provides predicted motions of the joint and/or predicted forces carried by the knee ligaments thereby allowing a surgeon to identify which ligaments need to be treated and how, e.g., for reconstruction, including graft placement, graft stiffness, graft tension, knee position at which graft is fixed/placed. The surgeon then performs, e.g., reconstruction of an ACL or an ACL graft. The computer model also provides predicted forces carried by the menisci which contact one or more bones of the joint.

In accordance with an aspect of the present embodiment, a surgeon can utilize the data provided by the computer model of the joint, e.g., a knee joint, to develop a treatment plan for an ACL reconstruction. Specifically, the computer model of the joint provides predictive forces of the ligaments on the joint, contact forces between bones of the joint, and kinematic motion data of the joint as it simulates a range of motion. In the case of an ACL reconstruction, the surgeon uses the data to determine an optimized attachment point of the ACL graft to the patient's bone. This is accomplished by cycling through a simulated range of motion of the computer model of the knee joint with a number or a plurality of attachment points or points in which a tunnel in the bone is to be drilled for attachment of the ACL graft, for attachment of the ACL graft to bone to determine the optimal position for attachment. The optimal position for attachment is determined when the forces on the ACL graft and/or one or more other ligaments of the computer model of the knee joint are optimized based on surgeon preference or another objective criteria, e.g., reconstruction parameters that avoid exceeding a failure load of a ligament graft, achieving a predefined motion pattern of the knee, or not exceeding a given cartilage contact force profile. The optimal position for attachment can also be based upon assessment of the kinematic motion of the knee joint when simulated through a range of motion for various points of attachment modeled with the computer model of the knee joint.

In accordance with another aspect of the present embodiment, a surgeon can utilize the data provided by the computer model of the joint, e.g., a knee joint, to develop a treatment plan for a knee arthroplasty. Specifically, the computer model of the knee joint can be supplemented with computer models of a knee replacement implant, e.g., a total knee replacement. The computer model of the knee replacement implant can be positioned on the computer model of the knee joint as if implanted and then the entire construct simulated through a range of motion to determine the predicted forces on the ligaments and bones, as well as the predicted kinematic motion. Then, based on the outcome of the simulation data, the surgeon can adjust the positions of the various implant components to determine a better or optimal implantation position. This process can be repeated until necessary to determine the optimal implantation position of an implant on a patient's bone for optimal outcome performance. This process can also be utilized for any joint of the patient and any other joint arthroplasty procedure, such as, unicompartmental knee replacement, a hip replacement, an ankle replacement, a shoulder replacement, an elbow replacement, etc.

In accordance with another aspect of the present embodiment, a surgeon can utilize the data provided by the computer model of the joint to develop a treatment plan for physical therapy of the joint. Based on the predicted forces provided by the computer model of the joint, the surgeon or physician utilizes the data to develop or tailor a physical therapy protocol that avoids potential harmful forces on specific ligaments of the joint, or for joints that have recently been surgically treated, such as an ACL graft.

In accordance with another aspect of the present embodiment, a surgeon can utilize the data provided by the computer model of the joint to develop an injury prevention plan or protocol. Based on the predicted forces provided by the computer model of the joint, the surgeon or physician utilizes the data to develop or tailor a plan or protocol that informs the patient of certain types of movements that are acceptable and will not further harm the joint, as well as provide information as to which activities to avoid to prevent injury to the joints and ligaments, e.g., a hard turn whereby a knee ligament can be injured. In other words, the data provided by the computer model of the joint can be used to develop an injury risk assessment for the patient.

Example I

The following is a non-limiting comparative example of an exemplary embodiment of a computer model of joint in accordance with the present invention as applied to a knee joint and compared with experimental measurements of knee joints. This example included the use of nine modeled ligaments and a defined number of fibers for each ligament. However, the objective function used in the computational computer model can be configured with more or less than nine ligaments, such as 2, 3, 4, 5, 6, 7, 8, 10, 11, 12, 13, 14, 15 or more ligaments, which represent other or additional ligaments in the knee joint. Further, the number of fibers used to represent each ligament can be more or less than the values states above, for example, 1, 2, 3, 4, 5, 6, 7, 8, 9, 10, 11, 12, 13, 14, 15 or more fibers. Further, the optimization can be configured to include magnitude of force targets or components of force targets for individual fibers or groups of fibers of a ligament, or to achieve load targets at one or more than one flexion angle or position or loading condition of the knee.

Nomenclature n Variable based on the number of fibers and their arrangement
l Inter insertional distance for each fiber
i̇ First derivative of the inter insertional distance with respect to time
$l_0$ Ligament fiber slack length
f*(l) Cubic spline representing the ligament force-elongation response in a toe region
K Linear portion of the force-elongation response
$\Delta_t$ Transition between the toe region and linear region
$c_d$ Parallel damping term
B Step function
$l_e$ Fiber length at full extension
i Number of ligaments included in the optimization routine
$F_i^m$ Ligament force predicted by the model
$F_i^e$ Experimentally measured ligament force at full extension
a Number of fibers for each ligament
x Variable allowed to vary in a range of ±10
ACL Anterior cruciate ligament
PCL Posterior cruciate ligament
MPC Medial posterior capsule
LPC Lateral posterior capsule
OPL Oblique popliteal ligament
FFL Fabellofibular ligament
LCL Lateral collateral ligament
ALL Anterolateral ligament
POL Posterior oblique ligament
sMCL Superficial medial collateral ligament
$sMCL_{sphare2Tib}$ Superficial medial collateral ligament connections to the proximal tibia
$LM_{horn}$ Lateral meniscus horn attachment
$MM_{horn}$ Medial meniscus horn attachment
LM Lateral coronary ligament
MM Medial coronary ligament
AM Anteromedial
AL Anterolateral
PL Posterolateral
PM Posteromedial A computer model of a knee joint, and predictions of kinematics and ligament loads generated during passive knee flexion were compared with subject-specific experimental measurements from full extension to deep flexion (about 130°). The computer model allowed for characterization of passive knee flexion from full extension through deep flexion at low ligament loads, and coupled internal rotation and anterior translation of the tibia.

Figure 7:
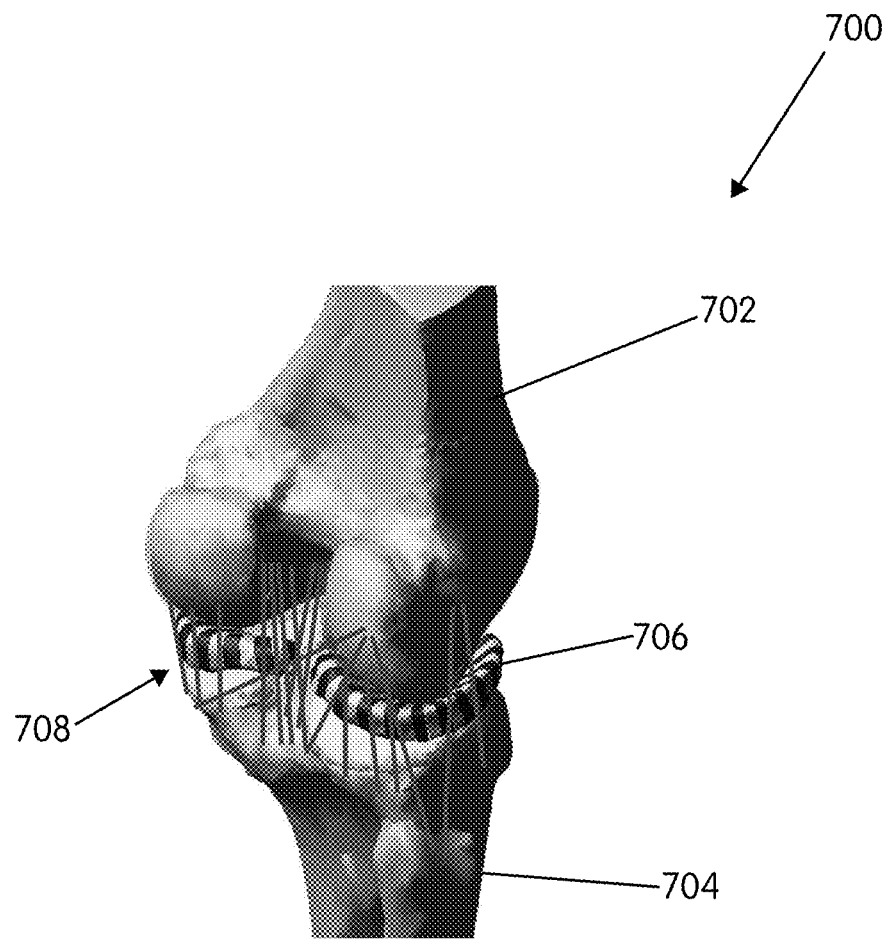
FIG. 7 is a posterior perspective view of a multibody computer model of a knee joint in accordance with an exemplary embodiment of the present invention.

Referring to FIG. 7, the computer model 700 is designed based, in part, on the following factors: 1) choice of or a predetermined ligament slack length, and 2) the location and number of fibers used to represent the ligaments of the knee joint on the computer model, especially the cruciate ligaments. The algorithm defined in Equation E2 below was used to determine the predetermined slack length for each ligament fiber of the computational computer model. Ligament slack length is defined as the length of a ligament at which the ligament fibers begin to carry a load.

The multibody computational computer model of the knee joint 700 was developed and compared to predictions of ligament loads and tibiofemoral kinematics during passive flexion on a one-to-one basis with experimental data measured from the same specimen (i.e., a cadaver knee joint) that was modeled. That is the femoral bone 702, tibial bone 704 and menisci 706 were modeled as a 3D computer model based on the cadaver knee joint experimentally assessed.

Slack length of knee ligament fibers were determined using experimentally measured ligament loads at full extension of a cadaver. Each ligament of the knee, including the cruciate ligaments, was developed i.e., modeled on the computer model as a multifiber representation of the ligament. Such formulations of ligament fibers produced ligament loading patterns over a large range of passive flexion from full extension to deep flexion (130°) that agreed with the subject-specific cadaveric measurements at low ligament forces.

The computer model 700 was constructed to model passive knee flexion through a large functionally important range of motion i.e., from 0° to 130° flexion, since this is a common peri- and intra-operative clinical examination. This range of flexion introduces large changes in the relative orientation of the tibial and femoral insertions of each ligament including the cruciates.

Conventional two-fiber representations of the ACL cannot and do not capture loading patterns in this ligament over flexion range from about 0 to 130° flexion. However, the computer model 700 and method of constructing the computer model yielded loading patterns that agreed well with subject-specific in-situ load measurements, as shown e.g., in FIGS. 15A-E and discussed in Table 3 below. This was accomplished by utilizing predefined slack lengths and an appropriate fiber architecture for the cruciates and collateral ligaments of the knee joint. The predefined slack lengths are determined based on the algorithm defined in Equation E2 below.

Further, the computer model 700 allowed for assessment of additional diverse loading conditions, such as, applied axial loads, combined moments of e.g., valgus and internal rotation of the model, or any applied loads including those simulating functional activities such as walking, running and stair climbing.

The loads measured in the PCL and ACL in cadaver experiments (further discussed below) were similar to other in-situ measurements of cruciate loads during passive flexion as reported in the literature and know in the art. For example, in one robotic experiment, maximum in-situ PCL loads of 15±3 N in nine cadaver knees at 90° of passive flexion were measured, which agrees with the magnitude and angle at which load was highest in our in-situ measurement (9 N at 90°). See Hoher, J., Vogrin, T. M., Woo, S. L., Carlin, G. J., Aroen, A., and Harner, C. D., 1999, "In-situ forces in the human posterior cruciate ligament in response to muscle loads: a cadaveric study," J Orthop Res, 17(5), pp. 763-768. Similarly, in a study of 17 cadaver knees ACL loads averaged about 42±10 N at full extension. See Markolf, K. L., Gorek, J. F., Kabo, J. M., and Shapiro, M. S., 1990, "Direct measurement of resultant forces in the anterior cruciate ligament. An in vitro study performed with a new experimental technique," J Bone Joint Surg Am, 72(4), pp. 557-567. These data agree with our in-situ load measurement of 37 N in the ACL at full extension.

In constructing the computer model 700, a toe region of the force-elongation response was developed for each ligament fiber on a ligament-by-ligament basis. The toe region varied from 1.2% to 3.7% strain across ligament fibers.

The formulations for ligament slack lengths and cruciate fiber architecture also allowed the computer model 700 to demonstrate anterior translation of the tibia (or femoral rollback), and the screw-home mechanism that includes tibial internal rotation through the flexion path. The predictions from the computer model on these knee kinematic characteristics differed by only 0.4 mm RMS and by 1.6° RMS from the respective experimental measurements of the cadaver knee joint, as further discussed below and in Table 3.

The computer model 700 included formulations for ligament slack length and cruciate fiber architecture that achieved low ligament loads and coupled anterior translation and internal rotation of the tibia through flexion. The computer model and method of determining slack lengths of the ligament fibers does not account for ligaments that are unloaded in full extension. The computer model and method of determining slack lengths can be configured to include flexion angles that do bear a load.

The slack lengths of ligament fibers were determined or optimized per an objective function (see Equation E2 as further described below) while allowing the tibia one degree of freedom in the proximal-distal direction. This resulted in an internal rotation moment of 2.5 Nm in the rotational constraint after the optimization converged. After the constraint was released the tibia rotated externally. This decreased tension in the ACL, PCL, and LCL at full extension during the simulation of passive flexion. This may be remedied by including an additional term in our objective function Equation E2 described below, to minimize the axial rotational moments or by optimizing the individual force components of each ligament instead of only the force magnitude.

Kinematic predictions of the computer model 700 differed mostly from the experimental results of the cadaver knee joint in the frontal plane. Since the ACL resists medial translation and varus angulation, adding an additional pretension to the anterolateral fibers of the ACL, which appear to be taut through passive flexion, may be used to resolve this discrepancy. Furthermore, wrapping (as further discussed below) of the POL and incorporating multiple force elements representing the antero- and posterolateral tissues can be included in the computer model to prevent medial tibial translation.

The computer model 700 was based on population mean structural properties to describe the force-elongation response of ligament(s) including the toe region and subsequent linear regions. Subject-specific properties can be included to improve agreement between the computer model and experimental data. However, the computer model of the knee joint was focused on developing a formulation for slack length based on the high sensitivity of ligament loads and knee kinematics to this parameter.

A simplified rigid body contact formulation was utilized to describe contact between opposing articular surfaces. The influence of the patellofemoral joint on knee kinematics and ligament loads was not included in the computer model as the computer model focused on the response of the tibiofemoral joint during passive flexion under a small compressive load, which minimizes the contribution of the patellofemoral joint. However, the computer model can alternatively be configured to include patellofemoral joint forces. No surrounding knee muscles or tendons were included in the computer model to reflect the experimental test conditions, which also minimizes the contribution of the patellofemoral joint to knee kinematics and ligament loads. The computer model focused on passive knee flexion because this reflects a common clinical assessment performed by the surgeon in the examination room and in the operating room.

The simplified rigid body contact formulation can be modeled with forces generated between contacting bodies as a non-linear function of penetration depth, x, and penetration velocity, $\dot{x}$, as per the following equation E3.

$$F = k(x)^e + c(d)\dot{x}$$

Experimental Procedure

Figure 8:
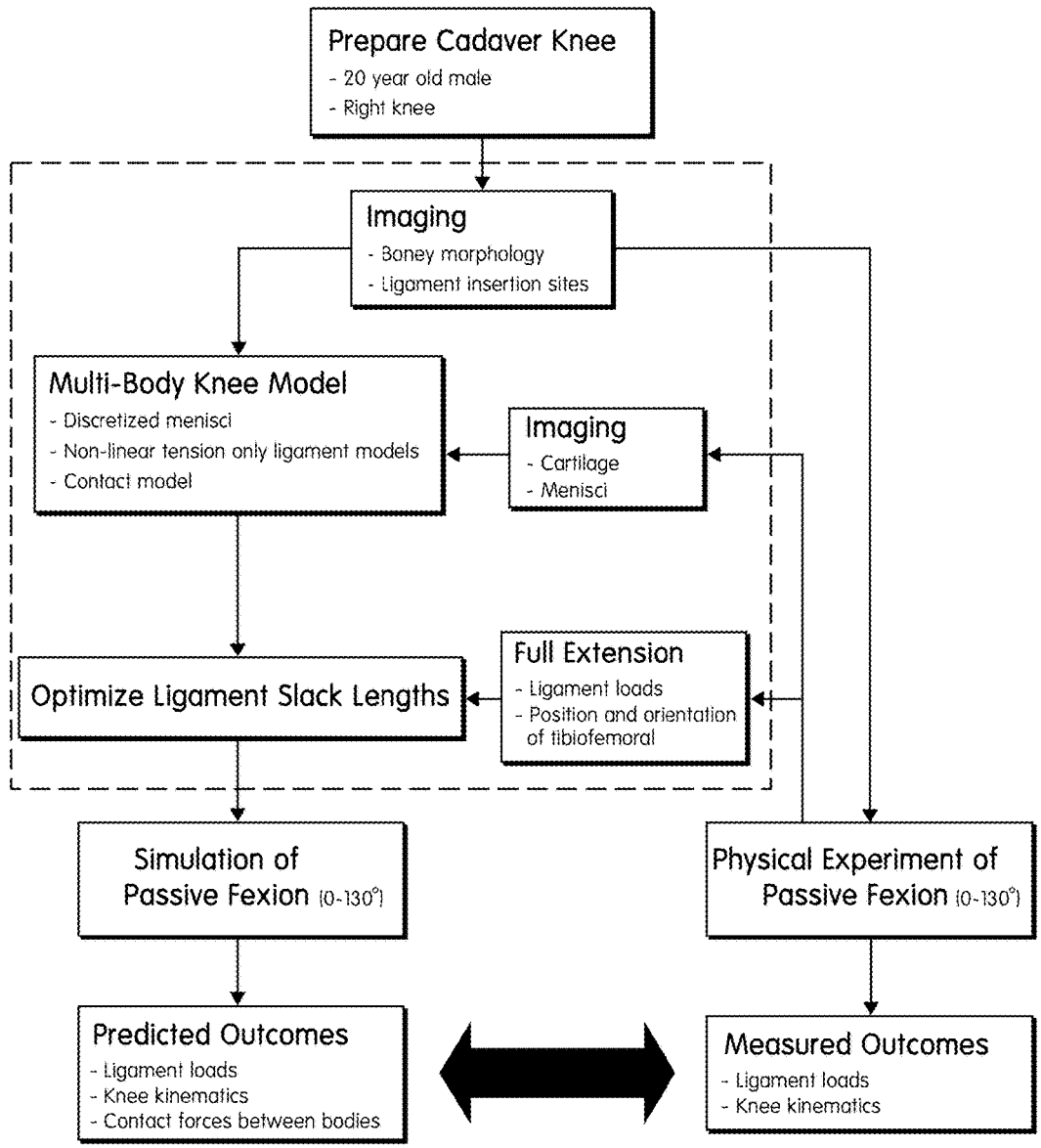
FIG. 8 is a flowchart of a method of constructing a computer model of a joint in accordance with an exemplary embodiment of the present invention.

Using a robotic testing system, an in vitro physical experiment was conducted prior to developing the computer model. Further details regarding the robotic testing system is disclosed in Imhauser, C., Mauro, C., Choi, D., Rosenberg, E., Mathew, S., Nguyen, J., Ma, Y., and Wickiewicz, T., 2013, "Abnormal tibiofemoral contact stress and its association with altered kinematics after center-center anterior cruciate ligament reconstruction: an in vitro study," Am J Sports Med, 41(4), pp. 815-825, the entire disclosure of which is hereby incorporated by reference herein in its entirety for all purposes. This physical experiment yielded data to assess predictions of the computer model on a one-to-one basis. FIG. 8 illustrates a flowchart of the method involved in the subject specific model development and comparison with physical experimentation.

Cadaver Knee Preparation and Imaging

A 20-year old male right cadaver knee was used for experimental evaluations. The specimen was stored at −20° C. and thawed for 24 hours at room temperature prior to testing. All soft tissues 10 cm from the joint line were removed from the femoral, tibial and fibula shafts. Surrounding skin and musculature except for the popliteal muscle tendon complex were subsequently removed. All remaining ligaments were left intact.

Figure 9:
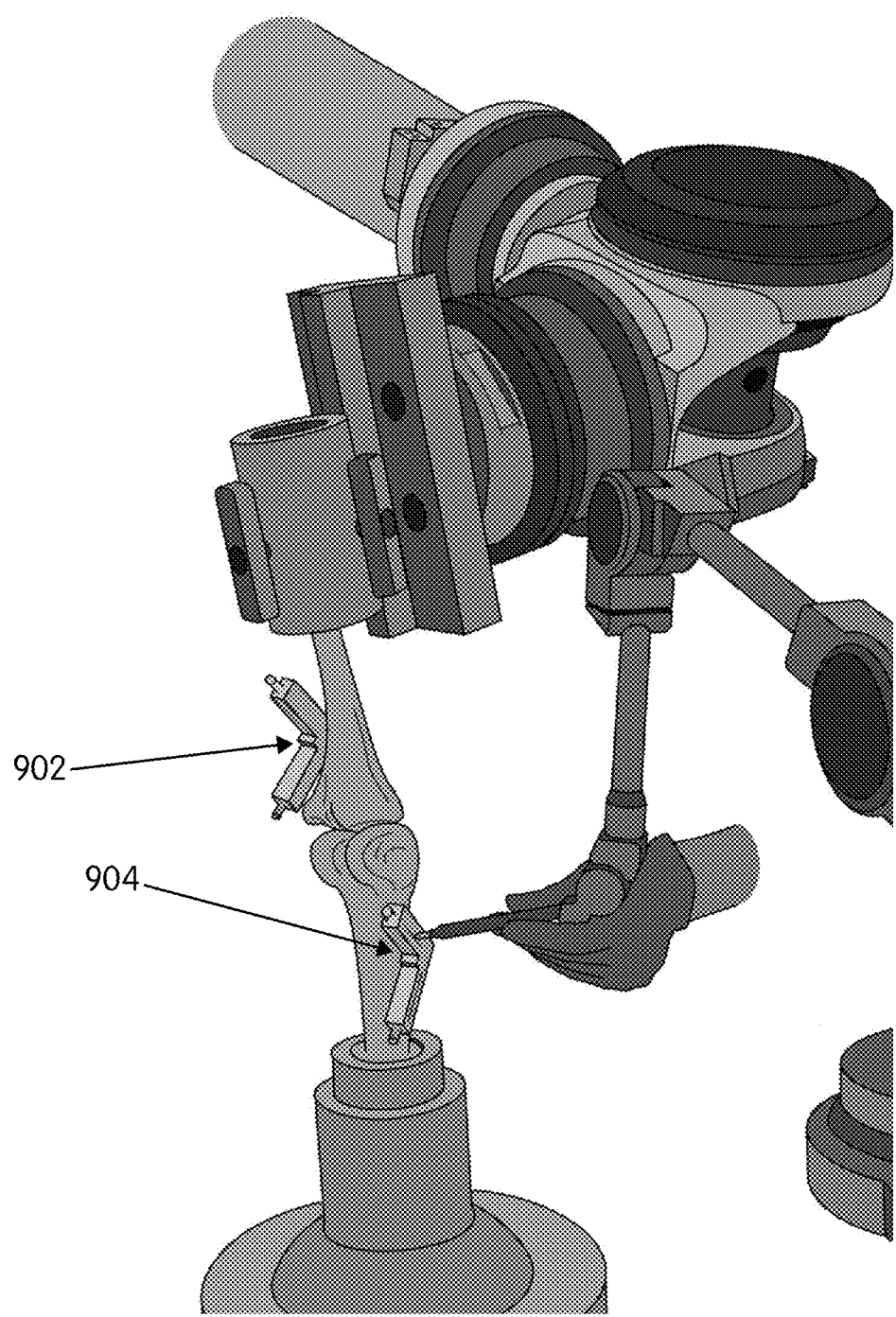
FIG. 9 is a perspective view of L-frames rigidly fixed to a cadaver knee joint having a tibia and a femur mounted to a six degrees of freedom robot used in a comparative example of the present invention.

An L-shaped reference frame (L-frame) made of poly (methyl methacrylate) was rigidly attached to both the femur and the tibia via two #10-24 Delrin screws that were 2.5 cm in length. The L-frames 902, 904 allowed registration e.g., to a common coordinate system for reporting knee motions, of the robotic experiment and the computational model (FIG. 9). The L-frames were rigidly fixed to the tibia and femur of the cadaver and identified using a 3D digitizer after the specimen was mounted to a six degrees of freedom robot. Two perpendicular lines were etched on the surface of each arm of the L-frame. Two cylindrical radiopaque glass tubes (~55 mm in length and 5 mm in diameter) were embedded in each arm of the L-frame and were aligned parallel to the etched lines. The hollow glass tubes are radiopaque and thus generated high contrast when scanned using computed tomography (CT), which allowed them to be easily identified. They could additionally have been filled with a contrast agent that can be easily visualized when scanning the specimen in MRI, and which does not generate artifact when used in the MRI scanner. This allowed registration of data from the MRI and CT.

Fiducial markers rigidly fixed to the tibia and femur enable direct comparison of knee motions obtained from the computer model with a physical experiment in a common coordinate system. The L-frames composed of radiopaque and high contrast medium allow them to be easily visualized in multiple imaging modalities such as magnetic resonance imaging (MRI) and CT. This feature enables registration of knee geometries (ligaments, menisci, cartilage, bones) obtained from different imaging modalities in a common coordinate system.

The cadaver knee was then placed in a CT scanner (Siemens, Biograph mCT, Germany), positioned in full extension, and scanned axially with a slice thickness of 0.625 mm and in-plane pixel dimensions of 0.6×0.6 mm². The CT data was subsequently used to generate 3D computer models (CAD models) of the femur, tibia, fibula, and the glass tubes embedded in the L-frames. The CAD representations (in stereolithography format (.stl)) of each glass tube was represented with about 3000 points. Principle component analysis (PCA) was used to identify the direction vectors corresponding to the long axes of these points. The direction vectors were used to define a homogeneous transformation matrix. The origin of this transformation matrix was the midpoint of the shortest distance between the two direction vectors.

After imaging, the cadaver knee was inspected via direct medial parapatellar arthrotomy to assure that no signs of ligamentous deficiency, bony abnormalities, or articular degeneration were present. The fibula was then cut about 6 cm from its proximal end and fixed to the tibia using a screw to maintain its anatomical orientation. The femur and tibia were potted in bonding cement (Bondo, 3M, St. Paul, Minn.). Four screws were drilled transversely along the length of the tibial and femoral shafts to ensure fixation between the bone and cement.

Physical Experiment of Passive Flexion

The cadaver knee was mounted to a six degrees of freedom robot (ZX165U, Kawasaki Robotics, Wixom, Mich.) instrumented with a universal force/moment sensor (resolution: Fx=Fy=0.125 N, Fz=0.25 N, Tx=Ty=Tz=0.0075 Nm, Theta, ATI, Apex, N.C.) mounted to the robot's end effector. The potted femur was first fixed to a pedestal that was secured to the floor, and then the knee was visually aligned in full extension. The tibia was subsequently mounted to a fixture attached to the end effector of the robot.

The locations of anatomical landmarks on the tibia and femur were identified with the knee mounted to the robot at full extension using a 3D digitizer with ≤0.05 mm accuracy (MicroScribe MX, Solution Technologies, Inc., Oella, Md.). The landmarks included: the femoral epicondyles, the distal tibia, the fibular insertion of the lateral collateral ligament (LCL), and a point in the center of the superficial medial collateral ligament (sMCL) about 15 mm below the joint line. These landmarks were subsequently used to define bone-fixed coordinate systems for the tibia and femur. The position and orientation of the tibia relative to the femur were expressed by adapting the conventions defined in Grood, E. S., and Suntay, W. J., 1983, "A joint coordinate system for the clinical description of three-dimensional motions: application to the knee," J Biomech Eng, 105(2), pp. 136-144. All translations were referenced to the midpoint of the line connecting the femoral epicondyles.

The L-frames were subsequently identified by using the 3D digitizer to scribe the two lines etched on the surface of each L-frame. The location of the digitizer was kept constant across the entire digitization process. This enabled the L-frames to be located relative to the previously digitized anatomical tibial and femoral landmarks. Digitization of each etched line yielded about 100 points. The major axis of each set of points was identified using PCA, yielding two direction vectors for each L-frame, which were used to define a homogeneous transformation matrix in the same manner as previously defined for the CT data of the glass tubes. The homogeneous transform defined by the etched lines were parallel and offset by a fixed amount (5.75 mm) with respect to the homogeneous transform defined by the glass tubes.

Next, the path of passive flexion was determined from full extension to 130° of flexion in 1° increments. This path was defined as the position and orientation of the tibiofemoral joint that achieved a 10 N compressive load with zero forces and moments in the remaining directions within tolerances of 5 N and 0.4 Nm. A load-minimization algorithm was implemented to identify the kinematic trajectory using custom code (i.e., MATLAB®, MathWorks, Natick, Mass.). The control structure of the robot relied on force feedback and a Newton-Raphson algorithm to identify the position of the tibia relative to the femur that minimizes the difference between the current load on the knee and the desired load on the knee within the specified tolerances The in-situ loads borne by the ligaments were measured across the entire flexion path by serially sectioning each structure and using the principle of superposition. The in-situ ligament loads were determined for the ACL, PCL, the sMCL, the central arm of the POL, the MPC and LPC, respectively, the FFL, and the LCL. The experimentally measured knee loads were filtered using a $4^{th}$-order Butterworth low pass filter with a 0.1 Hz cut-off frequency. The cut-off frequency was selected to be $\frac{1}{6}^{th}$ of the highest frequency in the load data to eliminate high frequency components of the signal. The filter was implemented using the signal processing toolbox available in MATLAB®.

Cartilage and Meniscal Imaging

The disarticulated tibia and femur with overlying articular cartilage and the menisci intact were CT-scanned after the physical experiment was completed. The bones and menisci were first dissected of remnants of any other soft tissues. Subsequently, the disarticulated tibia and femur were aligned sagittally in the core of the CT and scanned (0.625 mm slice thickness, 0.6×0.6 mm² in plane pixel dimensions). After this scan was completed, the menisci were positioned anatomically on top of the tibia, and sutured to the tibia at their horn attachments. The tibia and menisci were then scanned sagittally, producing a composite image of the tibial bone, cartilage, and meniscal geometries.

Computer Model Development of Knee Joint

Knee Geometries and Ligament Insertions

Figure 10A:
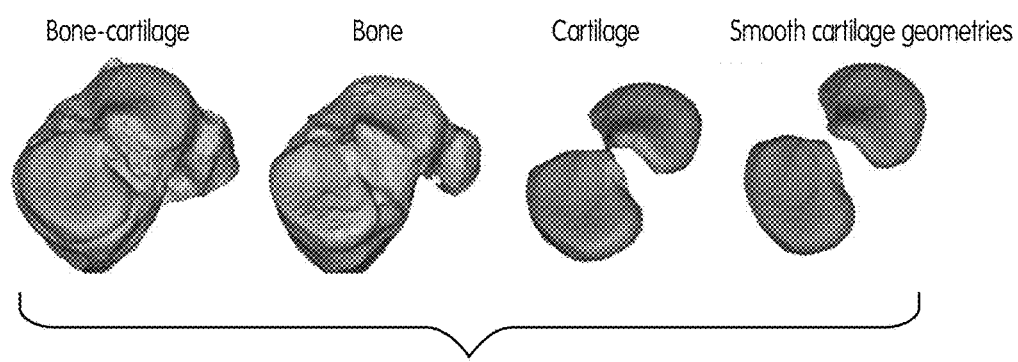
FIG. 10A are perspective 3D geometries of articular cartilage of a computer model of a knee joint in accordance with an exemplary embodiment of the present invention.
Figure 10B:
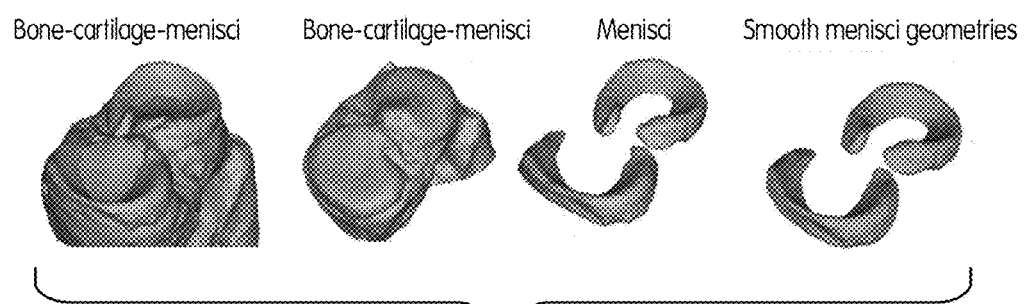
FIG. 10B are perspective 3D geometries of menisci of the computer model of FIG. 10A with surfaces smoothed by Boolean subtraction.

CT images of the knee joint bones were imported into image processing software (i.e., Mimics, Materialise, Inc., Belgium). The bone and cartilage geometries were isolated in two steps. First, using gray level thresholding, a mask was generated for the bone and for the combined geometry of the bone and cartilage. Then, Boolean subtraction was used to isolate the cartilage geometries (FIG. 10A). Similarly, the meniscal geometries were identified by overlapping a mask of the combined geometries of the tibia, cartilage, and menisci with the mask containing only the geometries of the tibia and the cartilage. Subsequently, Boolean subtraction was used to isolate the meniscal geometries (FIG. 10B). The surfaces were then smoothed using a filtering feature ("remove spikes") available in Geomagic Studio® (Geomagic, Inc., Morrisville, N.C.) which detected and flattened single-point spikes on the surface mesh.

Fibers were modeled as a one dimensional force element linking two bodies, in the case of a ligament the bodies were the tibia and femur geometries. A nonlinear tensile force is generated along the direction of this element, which is dependent on the distance of the two bodies from one another. The non-linear force is generated as a function of the slack length, toe region and stiffness based on the properties of each ligament (see Eq. E3A and E3B, and FIG. 13).

The insertions of the fibers used to represent each ligament were obtained from the CT images, from dissecting the specimen, and from information known in the art (FIGS. 11A-11F). The ACL was constructed from six fibers (FIG. 11A) with the tibial insertions of the fibers divided into anteromedial (AM), anterolateral (AL), and posterolateral (PL) groups. The femoral insertions of the fibers were placed halfway between the lateral intercondylar ridge (i.e., resident's ridge) and the posterior femoral cartilage. The three most proximal femoral insertions were connected to the AM and AL insertion groups on the tibia. The three most distal femoral insertions were connected to the PL group of tibial insertions.

Figure 11A:
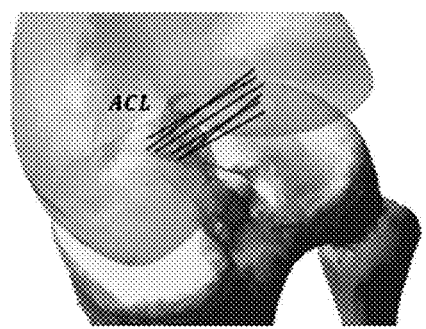
Figure 11B:
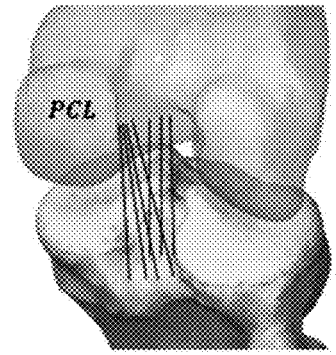

The PCL was constructed from seven fibers (FIG. 11B). The tibial insertions of the PCL fibers were divided into anterolateral (AL) and posteromedial (PM) groups. The femoral insertions were located along the medial intercondylar ridge (FIG. 11B). The four insertions closest to the posterior cartilage on the lateral aspect of the medial femoral condyle were connected to the PM group of tibial insertions. The three insertions closest to the femoral intercondylar ridge were connected to the AL group of tibial insertions.

Figure 11C:
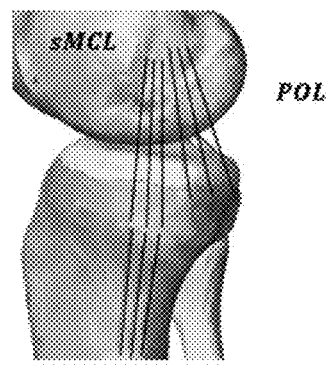
Figure 11D:
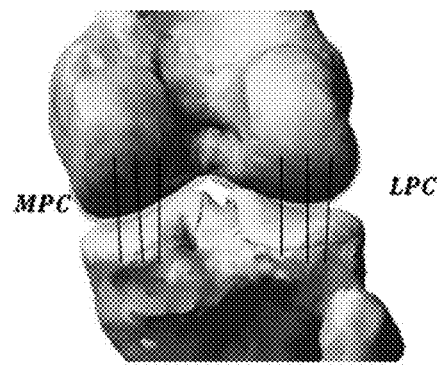
Figure 11E:
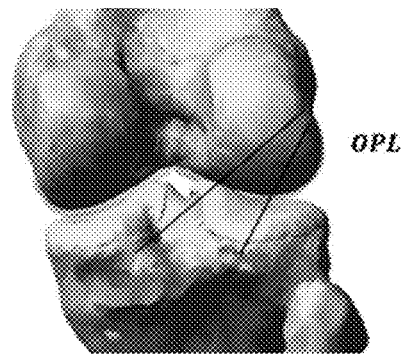
Figure 11F:
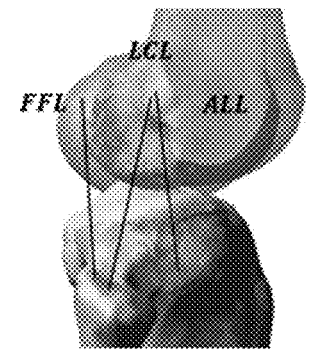

The sMCL was divided into distal and proximal groups; each group was constructed with three fibers (FIG. 11C). The POL, MPC and LPC were each described by three fibers spanning the area that they cover (FIGS. 11C and 11D). The oblique popliteal ligament (OPL) was divided into posterior and distal fibers (FIG. 11E). The LCL, the ALL, and the FFL were each constructed with one fiber (FIG. 11F).

Figure 12A:
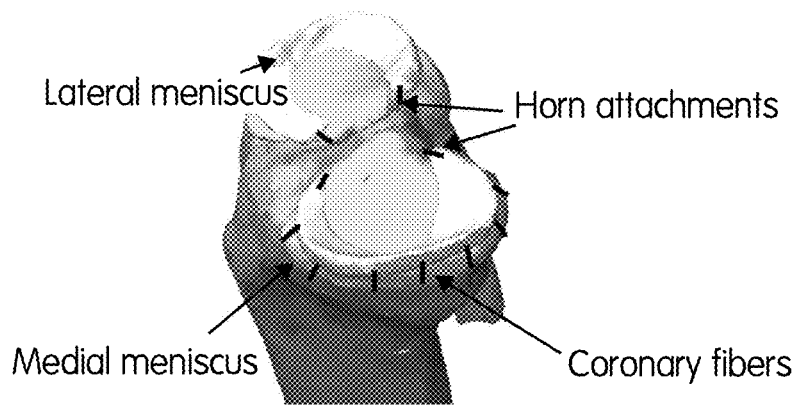
FIG. 12A is a perspective view of anterior and posterior horn attachments of the menisci of a computer model of a knee joint in accordance with an exemplary embodiment of the present invention represented with one fiber each and seven fibers (2 anterior, 3 medial, and 2 posterior) representing the coronary ligaments constraining the medial meniscus to the tibial plateau.
Figure 12B:
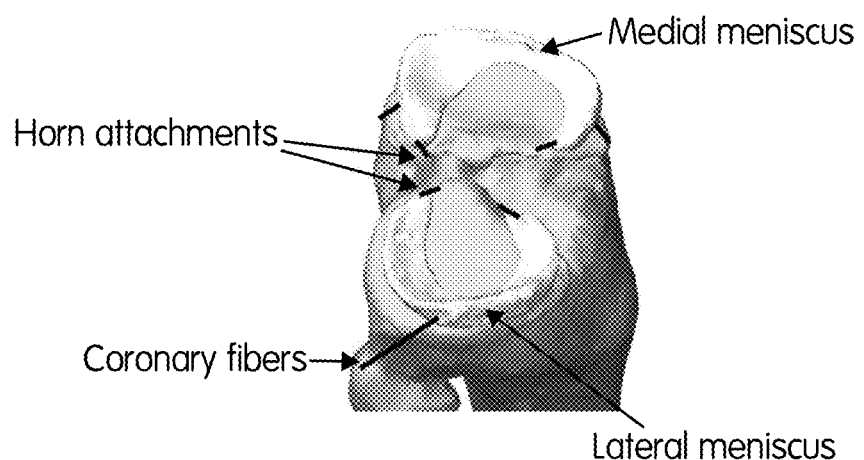
FIG. 12B is a perspective view of the computer model of the knee joint of FIG. 12A with anterior and posterior horn attachments of the menisci represented with one fiber each and one fiber representing the coronary ligament constraining the lateral meniscus to the tibia/fibula.

The horn attachments of the medial and lateral menisci were also constructed (modeled) with one fiber each (FIGS. 12A-B). Seven fibers (2 anterior, 3 medial, and 2 posterior) represented the attachments of the coronary ligaments from the medial meniscus to the tibial plateau (FIG. 12A). The lateral coronary ligament was constructed with one fiber (FIG. 12B).

All knee geometries and ligament insertions were transformed from the CT coordinate system to the femoral coordinate system $_{CT_f}^{F}T$ defined in our robotic experiment using a series of rigid body matrix multiplications (FIG. 20A, Equation E4A, Table A). Then, the relationship between the tibial coordinate system with respect to the femoral coordinate system was determined $_{T}^{F}T$ (Equation E4B). Subsequently, the tibia geometries identified in the CT coordinate system were transformed to the femoral coordinate system, $_{CT_t}^{F}T$ (Equation E4C) and combined with Equation E4B to describe the tibia relative to the femur.

EQUATIONS E4A-C $$_{CT_f}^{F}T = [_{F}^{D}T]^{-1} \times _{L_{D_f}}^{D}T \times _{L_{C_f}}^{L_{D_f}}T \times [_{L_{C_f}}^{CT_f}T]^{-1} \tag{E4A}$$

$$_{T}^{F}T = [_{F}^{D}T]^{-1} \times _{T}^{D}T \tag{E4B}$$

$$_{CT_t}^{F}T = _{T}^{F}T \times [_{T}^{D}T]^{-1} \times _{L_{D_t}}^{D}T \times _{L_{C_t}}^{L_{D_t}}T \times [_{L_{C_t}}^{CT_t}T]^{-1} \tag{E4C}$$

Figure 18A:
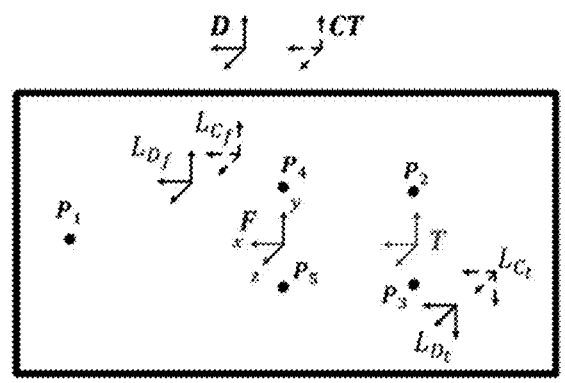
FIGS. 18A and 18B are schematic representations of a coordinate system used to register CT derived geometries to an anatomical coordinate system; in accordance with an exemplary embodiment of the present invention.
Figure 18B:
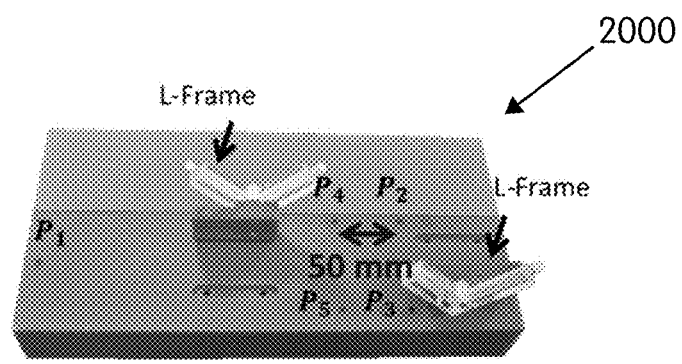

The accuracy of the method was quantified using a custom-fabricated validation jig 2000, which modeled all coordinate systems used in the registration procedure (FIGS. 18A, 18B). The validation jig was 18 cm in length and 36 cm in width. It consisted of L-frames representing those attached to the tibia and the femur, and five points representing the anatomical landmarks that defined the anatomical coordinate systems of the tibia and femur. The validation jig was fabricated using a computer controlled milling machine with accuracy of ±7.62 μm (±0.0003 in) and drilling accuracy of ±0.127 mm (±0.005 in). Accuracy was represented in the anatomical coordinate system used in this study. The registration technique had a positional accuracy of 0.54 mm, 0.29 mm, 0.10 mm in the x (proximal-distal), y (medial-lateral), and z directions (anterior-posterior), respectively, and 0.01°, 0.02°, and 0.00° about the x (internal-external rotation), y (flexion-extension), and z (varus-valgus) axes, respectively.

FIG. 18A is a schematic representing the coordinate systems used to register the CT-derived geometries to the anatomical coordinate system used in the physical experiment. This included the reference frames for the CT scanner (CT), the digitizer (D), the L-frames (L) identified both in CT and via the digitizer, and the anatomical coordinates systems for the tibia (T) and femur (F) based on the digitization points (P1 to P5); all symbols are summarized in Table A below. FIG. 18B illustrates the validation jig including well-defined positions and orientations of each coordinate system used to register the CT-derived geometries to the anatomical coordinate system.

TABLE A

| Symbols and notations | |
|---|---|
| Coordinate Systems | |
| D | Digitizer |
| $CT_f$ | Computed Tomography (femur) |
| $CT_t$ | Computed Tomography (tibia) |
| F | Femur |
| T | Tibia |
| $L_{Df}$ | Femoral L-Frame Identified via Digitizer |
| $L_{Dt}$ | Tibial L-Frame Identified via Digitizer |
| $L_{Cf}$ | Femoral L-Frame Identified via Computed Tomography |
| $L_{Ct}$ | Tibial L-Frame Identified via Computed Tomography |
| Anatomical Landmarks | |
| $P_1$, $P_2$, $P_3$, $P_4$, and $P_5$ | Five anatomical land marks |

Multibody Computational Computer Knee Model

Referring to FIG. 7, a 3D computational computer model of a knee joint 700 was constructed based on geometries of the bones 702, 704, articular cartilage, menisci 706, and ligaments 708 via Materialize Mimics and imported into multibody dynamics software using ADAMS™, Multibody Dynamics Simulation Software by MSC Software of Newport Beach, Calif. Ligament insertions represented in the femoral coordinate system of the femoral bone were imported into the knee model. Cartilage-cartilage contact and menisci-cartilage contact were modeled using the ADAMS™ default IMPACT function. The contact parameters used were those defined in Imhauser, C. W., Siegler, S., Udupa, J. K., and Toy, J. R., 2008, "Subject-specific models of the hindfoot reveal a relationship between morphology and passive mechanical properties," J Biomech, 41(6), pp. 1341-1349; Guess, T. M., Thiagarajan, G., Kia, M., and Mishra, M., 2010, "A subject specific multibody model of the knee with menisci," Medical engineering & physics, 32(5), pp. 505-515; and Kia, M., Stylianou, A. P., and Guess, T. M., 2014, "Evaluation of a musculoskeletal model with prosthetic knee through six experimental gait trials," Medical engineering & physics, 36(3), pp. 335-344.

To define structural properties of the menisci, the lateral and medial meniscal geometries were first discretized radially resulting in 34 and 31 wedge-shaped elements (or rigid bodies) respectively, as best shown in FIG. 7. The structural properties were defined by the method disclosed in Guess, T. M., Thiagarajan, G., Kia, M., and Mishra, M., 2010, "A subject specific multibody model of the knee with menisci," Medical engineering & physics, 32(5), pp. 505-515. The material properties of these tissue can also be based on information as they become available in the art or literature. A linear stiffness matrix was then used to connect neighboring elements, yielding multibody representations of deformable meniscal geometries.

Ligament fibers were represented with straight-line force elements connecting their tibial and femoral insertions. The structural properties of each ligament fiber were constructed using a tension-only, non-linear load-displacement relationship defined by Equations E3A and E3B.

$$F(l, \dot{l}, l_0) = \frac{1}{n}\{[f^*(l) + c_d \dot{l} B_1]B_2 + [K(l - (l_0 + \Delta_t)) + f^*(l_0 + \Delta_t) + c_d \dot{l} B_1]B_3\} \quad \text{EQUATION E3A}$$

$$B_1 = \text{step}(l, 0, 0, l + 0.1, 1) \quad \text{EQUATION E3B}$$
$$B_2 = \text{step}(l, l_0, 0, l_0 + 0.1, 1) \times$$
$$\text{step}(l, (l_0 + \Delta_t), 1, (l_0 + \Delta_t) + 0.001, 0)$$
$$B_3 = \text{step}(l, (l_0 + \Delta_t), 0, (l_0 + \Delta_t) + 0.001, 1)$$

In the above equations, n is based on the number of fibers and their arrangement, l is the inter-insertional distance, $\dot{l}$ is the first derivative of the inter-insertional distance with respect to time, $l_0$ is the ligament slack length, B is a step function, and $c_d$ is a damping term constant. $f^*(l)$ is a cubic spline representing the ligament force-elongation response in the toe region obtained by directly digitizing plots (using GraphClick, Arizona Software, AZ) of the ligament load-displacement response from Butler, D. L., Guan, Y., Kay, M. D., Cummings, J. F., Feder, S. M., and Levy, M. S., 1992, "Location-dependent variations in the material properties of the anterior cruciate ligament," J Biomech, 25(5), pp. 511-518; Robinson, J. R., Bull, A. M., and Amis, A. A., 2005, "Structural properties of the medial collateral ligament complex of the human knee," J Biomech, 38(5), pp. 1067-1074; Harner, C. D., Xerogeanes, J. W., Livesay, G. A., Carlin, G. J., Smith, B. A., Kusayama, T., Kashiwaguchi, S., and Woo, S. L., 1995, "The human posterior cruciate ligament complex: an interdisciplinary study. Ligament morphology and biomechanical evaluation," Am J Sports Med, 23(6), pp. 736-745; and Wilson, W. T., Deakin, A. H., Payne, A. P., Picard, F., and Wearing, S. C., 2012, "Comparative analysis of the structural properties of the collateral ligaments of the human knee," The Journal of orthopaedic and sports physical therapy, 42(4), pp. 345-351. K represents the linear portion of the force-elongation response.

Figure 13:
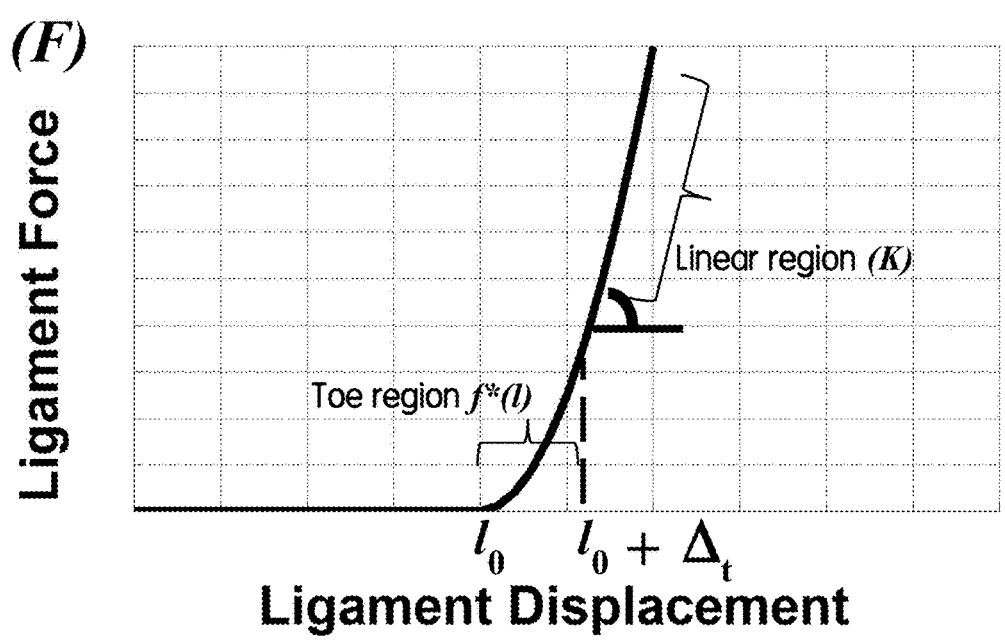
FIG. 13 is a force-elongation response graph for a ligament fiber of a computer model of a knee joint in accordance with an exemplary embodiment of the present invention having a slack length ($l_0$), a cubic spline f*(l) describing the toe region, a constant stiffness (K), and a term $\Delta_t$ that identifies the transition between the toe and liner stiffness regions.

The transition between the toe region and linear region is defined by $\Delta_t$ (FIG. 13, which illustrates representative force-elongation response for a ligament fiber which consists of the slack length ($l_0$), a cubic spline $f^*(l)$ describing the toe region, a constant stiffness (K), and a term $\Delta_t$, that identifies the transition between the toe and liner stiffness regions.). Each force element also included a parallel damping term ($c_d$=1.5 Ns/mm) based on the stress relaxation response of ligaments. The step functions $B_1$, $B_2$, and $B_3$ are cubic polynomials that allow continuous and smooth generation of tensile forces as a ligament fiber becomes taut. The location dependent structural properties of the AM, AL, and PL groups of the ACL were defined based on such properties disclosed in Butler, D. L., Guan, Y., Kay, M. D., Cummings, J. F., Feder, S. M., and Levy, M. S., 1992, "Location-dependent variations in the material properties of the anterior cruciate ligament," J Biomech, 25(5), pp. 511-518.

The structural properties of the ALL were assumed to be half of the LCL based on the observation that the ALL is thinner and less stout than the LCL. Alternatively, these properties can be assigned based on characterization of the material properties of the tissue as they become available in the art. The structural properties of the posterior capsule were described using a cubic spline fit to the properties of the sMCL, since both have a stout appearance based on visual inspection. The horn attachments of the menisci were modeled with a linear tension-only load-displacement response and a stiffness of 180 N/mm. Tibiomeniscal coronary ligaments were also modeled as tension-only linear springs on the medial and lateral side with a stiffness about half that of the sMCL.

The structural properties of all ligament fibers are summarized in Tables 1A and 1B where the ligament properties are as follows: $f^*(l)$ is a cubic spline describing the toe region, K is a constant stiffness, $\Delta_t$ is a term that identifies the transition between the toe and linear stiffness regions, $l_e$ is the ligament fiber length at full extension in the model, n is the number of fibers and their arrangement, and $B_1$, $B_2$, and $B_3$ are step functions.

Abbreviations in Tables 1A and 1B for ligament fiber names: anterior cruciate ligament-ACL (7 fibers), posterior cruciate ligament-PCL (6 fibers), medial and lateral posterior capsule-MPC and LPC (3 fibers each), oblique popliteal ligament-OPL (2 fibers), fabellofibular ligament-FFL (1 fiber), lateral collateral ligament-LCL (1 fiber), anterolateral ligament-ALL (1 fiber), posterior oblique ligament-POL (3 fibers), superficial medial collateral ligament-sMCL (1:3 proximal fibers and 4:6 distal fibers), superficial medial collateral ligament connections to the proximal tibia-$sMCL_{sphare2Tib}$ (3 fibers), lateral and medial meniscus horn attachments-$LM_{horn}$ and $MM_{horn}$ (2 fibers each), lateral and medial coronary ligaments-LM (1 fiber) and MM (7 fibers).

TABLE 1A

| Ligament fibers | Ligament fiber names | $f^*(l)$ spline | $l_e$ (mm) | $l_0/l_e$ (%) | $\Delta_f$ (mm) | K (N/mm) | n |
| --- | --- | --- | --- | --- | --- | --- | --- |
| 1 | $ACL_1$ | $ACL_{AM}$ | 43.79 | 97.1 | 1.516 | 19.09 | 2 |
| 2 | $ACL_3$ | $ACL_{AM}$ | 36.54 | 97.1 | 1.516 | 19.09 | 2 |
| 3 | $ACL_2$ | $ACL_{AL}$ | 42.05 | 97.1 | 2.012 | 25.4 | 1 |
| 4 | $ACL_4$ | $ACL_{PL}$ | 31.26 | 97.1 | 0.757 | 28.78 | 3 |
| 5 | $ACL_5$ | $ACL_{PL}$ | 32.39 | 97.1 | 0.757 | 28.78 | 3 |
| 6 | $ACL_6$ | $ACL_{PL}$ | 28.94 | 97.1 | 0.757 | 28.78 | 3 |
| 7 | $PCL_1$ | $PCL_{PM}$ | 41.66 | 97.5 | 2.073 | 57 | 4 |
| 8 | $PCL_2$ | $PCL_{PM}$ | 40.44 | 97.5 | 2.073 | 57 | 4 |
| 9 | $PCL_3$ | $PCL_{PM}$ | 39.71 | 97.5 | 2.073 | 57 | 4 |

TABLE 1A-continued

| Ligament fibers | Ligament fiber names | f* (l) spline | $l_e$ (mm) | $l_0/l_e$ (%) | $\Delta_f$ (mm) | K (N/mm) | n |
|---|---|---|---|---|---|---|---|
| 10 | $PCL_4$ | $PCL_{PM}$ | 40.38 | 97.5 | 2.073 | 57 | 4 |
| 11 | $PCL_5$ | $PCL_{AL}$ | 35.75 | 110 | 3.011 | 120 | 3 |
| 12 | $PCL_6$ | $PCL_{AL}$ | 36.51 | 110 | 3.011 | 120 | 3 |
| 13 | $PCL_7$ | $PCL_{AL}$ | 37.17 | 110 | 3.011 | 120 | 3 |
| 14[a] | $MPC_1$ | sMCL | 26.73 | 99.5 | — | — | 3 |
| 15[a] | $MPC_2$ | sMCL | 26.10 | 99.5 | — | — | 3 |
| 16[a] | $MPC_3$ | sMCL | 26.71 | 99.5 | — | — | 3 |
| 17[a] | $LPC_1$ | sMCL | 29.24 | 98.9 | — | — | 1 |
| 18[a] | $LPC_2$ | sMCL | 31.30 | 98.9 | — | — | 1 |
| 19[a] | $LPC_3$ | sMCL | 31.28 | 97.3 | — | — | 1 |
| 20[a] | $OPL_1$ | POL | 45.64 | 97.3 | — | — | 1 |
| 21[a] | $OPL_2$ | POL | 62.76 | 97.3 | — | — | 1 |
| 22[a] | FFL | POL | 56.89 | 99.4 | — | — | 1 |
| 23 | LCL | LCL | 58.64 | 97.4 | 1.505 | 59 | 1 |
| 24 | ALL | LCL | 47.55 | 110 | 1.505 | 30 | 1 |
| 25 | $POL_1$ | POL | 42.03 | 94.9 | 3.021 | 56 | 3 |
| 26 | $POL_2$ | POL | 43.00 | 94.9 | 3.021 | 56 | 3 |
| 27 | $POL_3$ | POL | 46.15 | 94.9 | 3.021 | 56 | 3 |
| 28 | $sMCL_1$ | sMCL | 39.59 | 100 | 2.517 | 80 | 2/3 |
| 29 | $sMCL_2$ | sMCL | 39.48 | 100 | 2.517 | 80 | 2/3 |
| 30 | $sMCL_3$ | sMCL | 39.45 | 100 | 2.517 | 80 | 2/3 |
| 31 | $sMCL_4$ | sMCL | 47.77 | 97.5 | 2.517 | 80 | 2/3 |
| 32 | $sMCL_5$ | sMCL | 47.76 | 97.5 | 2.517 | 80 | 2/3 |
| 33 | $sMCL_6$ | sMCL | 47.65 | 97.5 | 2.517 | 80 | 2/3 |
| 34[b] | $sMCL_{Sphere2Tb1}$ | — | 0.0 | — | — | 5 | 1 |
| 35[b] | $sMCL_{Sphere2Tb2}$ | — | 0.0 | — | — | 5 | 1 |
| 36[b] | $sMCL_{Sphere2Tb3}$ | — | 0.0 | — | — | 5 | 1 |

[a]$B_3 = 0$.
[b]$f^*(l) = 0$, $B_2 = 0$, $B_3 = \text{step}(l, l_0, 0, l_0 + 0.1, 1)$.

TABLE 1B

| Ligament fibers | Ligament fiber names | f* (l) spline | $l_e$ (mm) | $l_0/l_e$ (%) | $\Delta_f$ (mm) | K (N/mm) | n |
|---|---|---|---|---|---|---|---|
| 1[b] | $LM_{Hom1}$ | — | 0.0 | — | — | 180 | 1 |
| 2[b] | $LM_{Hom1}$ | — | 0.0 | — | — | 180 | 1 |
| 3[b] | $MM_{Hom1}$ | — | 0.0 | — | — | 180 | 1 |
| 4[b] | $MM_{Hom2}$ | — | 0.0 | — | — | 180 | 1 |
| 5[b] | $LM_1$ | — | 29.65 | 100 | — | 36 | 1 |
| 6[b] | $MM_1$ | — | 7.60 | 100 | — | 36 | 1 |
| 7[b] | $MM_2$ | — | 4.40 | 100 | — | 36 | 1 |
| 8[b] | $MM_3$ | — | 7.07 | 100 | — | 36 | 1 |
| 9[b] | $MM_4$ | — | 7.04 | 100 | — | 36 | 1 |
| 10[b] | $MM_5$ | — | 5.07 | 100 | — | 36 | 1 |
| 11[b] | $MM_6$ | — | 6.54 | 100 | — | 36 | 1 |
| 12[b] | $MM_7$ | — | 6.52 | 100 | — | 36 | 1 |

[a]$B_3 = 0$.
[b]$f^*(l) = 0$, $B_2 = 0$, $B_3 = \text{step}(l, l_0, 0, l_0 + 0.1, 1)$.

A generalized reduced gradient optimization algorithm was utilized to determine the slack lengths ($l_0$) of the ligament fibers. This optimization focused on those ligaments that were observed to be taut at full extension or that carried load at full extension in our physical experiment. The goal of the optimization was to find $l_0$ as a percentage of the fiber length at full extension ($l_e$) in these ligaments. The objective function i.e., Equation E2 describes the differences between the ligament loads predicted by the computer model ($F_{i,j}^m$) and the experimentally measured ligament loads at full extension ($F_i^e$). The predicted ligament load was the vectoral magnitude of force in each ligament fiber.

Altogether, $l_0$ was optimized for 29 fibers across nine ligaments (Equation E2). The initial value of $l_0$ was defined to be the fiber length at full extension, and $l_0$ was allowed to vary by ±10% from the initial value.

$$\min \sum_{i=1}^{9} \left( \left| \sum_{j=1}^{a_i} F_{i,j}^m(l, \dot{l}, l_0) \right| - F_i^e \right)^4 \quad \text{EQUATION E2}$$

$a$ = number of fibers for each ligament with 9 ligaments included in the optimization $F_{i,j}^m = \{ACL, sMCL, LCL, FFL, OPL,$ $POL, MPC, LPC, PCL_{PM}\}$ $F_i^e = \{37, 4, 20, 1, 10, 18, 1, 4, 10\}N$ $a = \{6, 6, 1, 1, 2, 3, 3, 3, 4\}$fibers $l_0 = l_e(100 - x) \% -10 \leq x \leq +10$ The optimization was performed with the knee at full extension while permitting the tibia to move in the proximal-distal direction under a 10 N compressive load. The resolved penetration between the cartilage and meniscal surfaces was ≤0.7 mm. The remaining degrees of freedom were held constant, matching those of the physical experiment.

The groups of proximal and distal fibers comprising the sMCL were each assigned to carry the experimentally measured load in the entire sMCL since they were in series. The posteromedial fibers of the PCL were included in the optimization to achieve their experimentally measured load at full extension because these fibers were observed during dissection of the knee to be taut at full extension.

Ligaments that were observed to be slack or that did not carry load at full extension in our physical experiment were not included in the optimization. The anterolateral fibers of the PCL were observed to be slack at full extension; therefore, their slack lengths were defined based on their computed longest length obtained from the experimentally measured flexion path. The ALL was also observed to be slack at extension; therefore, the slack length of the ALL fiber was increased by 10% of its length at full extension. The slack lengths of all fibers of the coronary ligaments were assumed to be their lengths at full extension. The fibers of the medial and lateral posterior capsule became slack with flexion in the experiment; thus, these groups were deactivated at flexion angles >30°.

Figure 14:
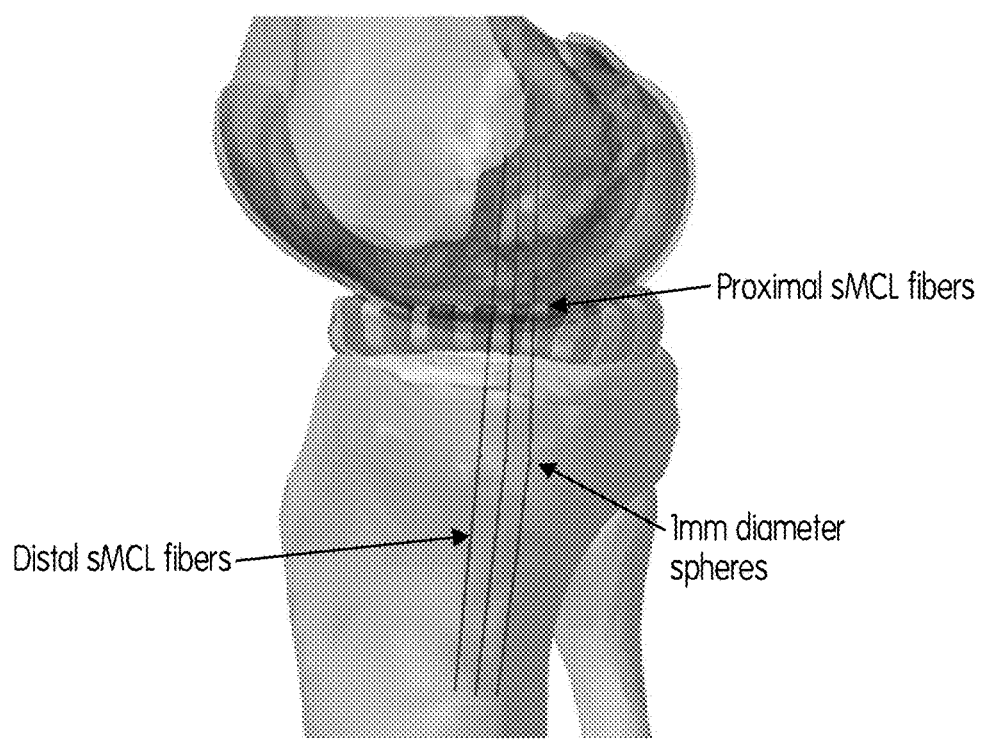
FIG. 14 is a side view of a computer model of a knee joint in accordance with an exemplary embodiment of the present invention illustrating proximal and distal fibers of a superficial MCL connected in series with spheres to simulate wrapping with the spheres constrained to a plane that is oriented tangent to a proximal surface of the tibia via a planar joint and constrained within this plane with a linear spring.

Wrapping of the sMCL was modeled by connecting its proximal and distal fiber groups with 1 mm diameter spheres located ~10 mm below the joint line (FIG. 14). Each sphere was constrained tangent to the proximal surface of the tibia via a planar joint and constrained within this plane using a linear spring.

A planar joint or planar constraint is a kinematic constraint that has three degrees of freedom. This constraint allows two independent translations within the plane and one rotation about an axis perpendicular to the plane. The spheres are rigid bodies with spherical shape. In the model their motion is limited by the planar constraint.

The spring was assigned a stiffness ten times less than that of the sMCL based on the weak connection that was observed between the sMCL and the proximal tibia when this structure was dissected.

Simulation of Passive Knee Flexion

The boundary conditions defined in the computer model 700 of passive flexion matched those in the physical experiment. That is, the femur was fixed in all directions except for rotation about its transepicondylar axis. The tibia was fixed in flexion, but free to translate and rotate in all other directions. Passive flexion was modeled by rotating the femur about its transepicondylar axis from full extension to 130° at a rate of 1.35°/sec, while applying 10 N of compression across the tibiofemoral contacting surfaces. The femur was rotated at this angular velocity to model the slow rate of loading in the robot experiment. The tibial and femoral coordinate systems and the description of knee kinematics were the same as in the physical experiment.

Solver Parameters

The equations of motion were generated and solved using ADAMS™. The simulation process required setting up run time and solver parameters (GSTIFF integrator) including an integrator error of 0.001, maximum number of iterations of ten, and initial simulation step size of 0.05 s. Further details regarding the simulation process applicable to this example are disclosed in Gear, C. W., 1971, "Simultaneous numerical solution of differential algebraic equations," IEEE Trans Circuit Theory, 18, pp. 89-95, the entire disclosure of which is hereby incorporated by reference herein for all purposes.

Computer Model Evaluation

The loads and kinematics predicted in our computational computer model were compared to their corresponding measurements from the physical experiment. Load borne by knee ligaments (ACL, PCL, LCL, sMCL, and POL) were measured. The kinematic outcomes were: 1) transverse plane motion including internal-external rotation; 2) sagittal plane motions including posterior-anterior and proximal-distal translations; and 3) frontal plane motions including medial-lateral translation and varus-valgus rotation. The model outputs were discretized into 1° increments to compare with the 1° increments of data obtained in the physical experiment. The root mean square (RMS) difference of each outcome across the entire flexion path was calculated. The maximum loads in the passive stabilizers across the entire flexion path as predicted by the computer model were compared to those measured in the physical experiment.

Results

We used subject-specific in-situ measurements of ligament load and optimization to estimate slack length for the individual fibers of each ligament. The method of assigning ligament slack length using the optimization routine yielded ligament loads that were within 0.8 N of those measured in the experiment at full extension. Slack lengths included in the optimization routine ranged between −1% (sMCL) to 6.9% (POL) of ligament fiber lengths at full extension (Table 2).

The slack length was found to have a strong effect on predictions of kinematics and ligament loads in the computer model 700. This is a critical feature of the computer model since it was determined that slack length can compensate for structures that are not modeled on the computer model 700, such as the menisci and capsular ligaments, leading to abnormally high ligament loads. This allows for the computer model to advantageously enable prediction of passive flexion kinematics and ligament loading patterns through about 130° of passive flexion arc using a minimal set of information, including position of the knee and ligament loads at a single flexion angle. Further, the computer model is capable of making accurate predictions of instability, which is a common symptom of an ACL-deficient knee. Instability is defined as sudden, abrupt changes in the position and/or orientation of the knee with small levels of applied load. This clinical symptom results in compromised function and injury to the cartilage and menisci.

Additionally, removing the ACL in our computer model caused increased loading of the medial meniscus in response to an anteriorly applied tibial load. This finding corroborates cadaveric testing and clinical findings of damage to the medial meniscus with chronic ACL insufficiency.

TABLE 2

Ligament slack length ($l_0$) defined as a percentage change in fiber length at full extension ($l_e$) as determined by an optimization routine.

| | sMCL | LCL | ACL | $PCL_{PM}$ | MPC | LPC | POL | OPL | FFL |
|---|---|---|---|---|---|---|---|---|---|
| $(1 - l_0/l_e)\%$ | −0.0 | 2.6 | 2.9 | 2.5 | 0.5 | 1.1 | 5.1 | 2.7 | 0.6 |

Abbreviations: Superficial medial collateral ligament (sMCL), lateral collateral ligament (LCL), anterior cruciate ligament (ACL), posteromedial fiber of the posterior cruciate ligament ($PCL_{PM}$), medial posterior capsule (MPC), lateral posterior capsule (LPC), posterior oblique ligament (POL), oblique popliteal ligament (OPL), and fabellofibular ligament (FFL).

Figure 15A:
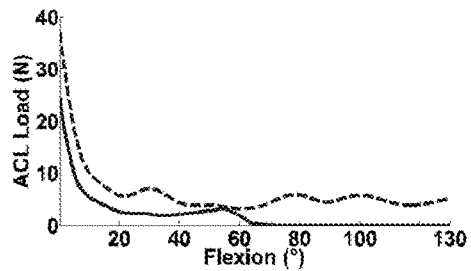
FIGS. 15A-15E are graphs of load v. knee flexion angle of the computer model of the knee joint of FIGS. 11A-F compared to experimental values with computer model predicted (solid line) and experimentally measured (dashed line) ligament loads across the passive flexion path from 0 to 130°.

None of the predicted ligament loads differed from their respective experimentally measured magnitudes across the entire range of passive flexion (0 to) 130° by more than 5.7 N RMS (Table 3). Maximum load in the ACL occurred at full extension reaching 19 N and 37 N in the model and experiment, respectively. The load rapidly dropped with knee flexion in both the model and the experiment from full extension to 20° flexion (FIG. 15A). In the model, the load borne by the ACL achieved a constant level of 2 N from 20 to 50° flexion and then decreased to zero for the remainder of the flexion path. In the experiment, ACL load maintained a relatively constant tension of 5 N from 20° through deep flexion.

Figure 15B:
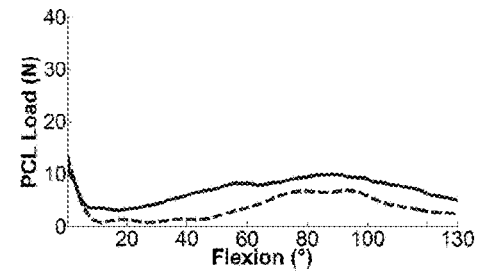

Force in the PCL dropped rapidly from full extension to 10° flexion in both the model and the experiment (FIG. 15B). The predicted PCL load then gradually increased to a maximum of 9 N at 90° flexion. Similarly, the experimentally measured load in the PCL gradually increased to a maximum of 7 N at 93° flexion (FIG. 15B).

Figure 15C:
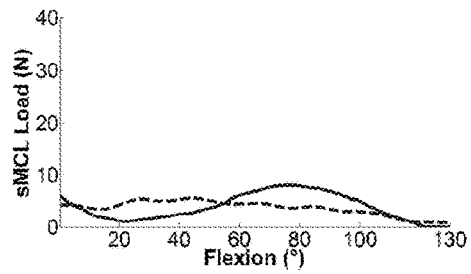
Figure 15D:
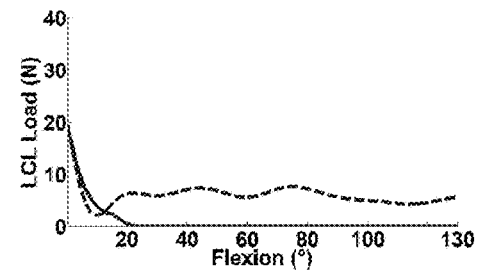
Figure 15E:
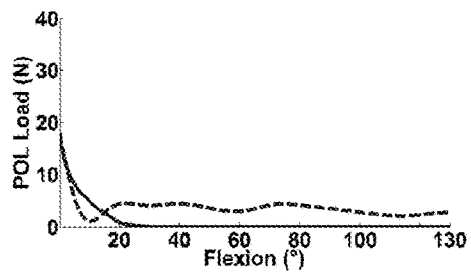

Forces borne by the sMCL were no more than 8 N and 6 N in the model and the experiment, respectively (FIG. 15C). LCL load was maximum at full extension in both the model (17 N) and the experiment (20 N) (FIG. 15D). Load in the LCL rapidly decreased in both the model and the experiment as the knee flexed beyond full extension reaching a minimum at 20° and 10° flexion, respectively (FIG. 15D). Similarly, load in the POL was maximum at full-extension in both the model (16 N) and the experiment (18 N) and rapidly decreased reaching a minimum at 20° and 10° flexion, respectively (FIG. 15E). The predicted sMCL, LCL, and POL load differed from the experimentally measured load by 2.2, 5.7, and 3.3 N RMS, respectively (Table 3).

TABLE 3

Root mean square difference (RMSD) between experimentally measured and predicted ligament loads during passive flexion from 0 to 130°.

RMSD (N)

| ACL | PCL | sMCL | LCL | POL |
|-----|-----|------|-----|-----|
| 5.5 | 2.7 | 2.2  | 5.7 | 3.3 |

Figure 16A:
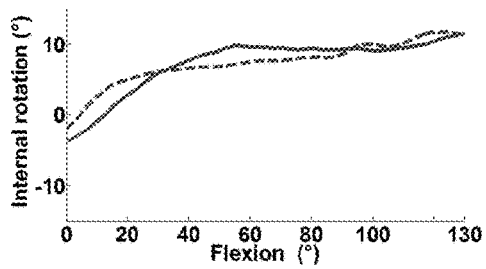
FIGS. 16A-16E are graphs of knee kinematics v. knee flexion angle of the computer model of the knee joint of FIGS. 11A-F compared to experimental values with computer model predicted (solid line) and experimentally measured (dashed line) kinematics of the tibia with respect to the femur.
Figure 16B:
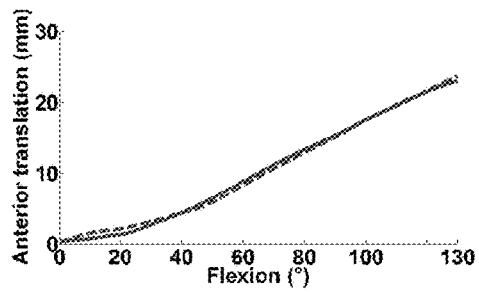
Figure 16C:
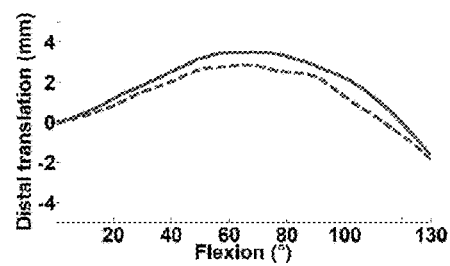
Figure 16D:
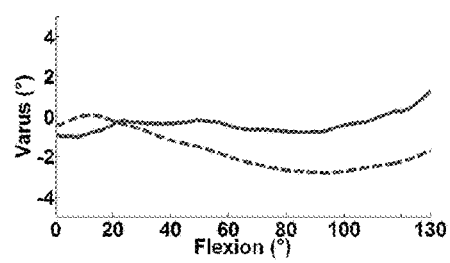
Figure 16E:
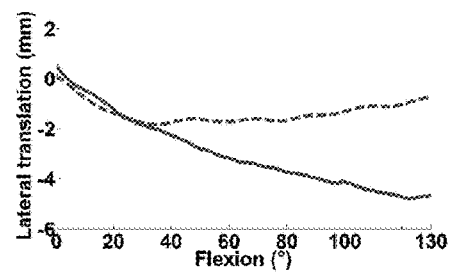

The predicted tibial internal rotation differed from the experimentally measured data by 1.6° RMS across the entire range of flexion (Table 4, FIG. 16A). In the sagittal plane, the tibia translated anteriorly a total of 22.9 mm and 23.7 mm in the model and the experiment, respectively (FIG. 16B), with an RMS difference of 0.4 mm (Table 4) across the entire range of passive flexion. The predicted tibial distal translation differed from the experimentally measured data by 0.7 mm RMS across the entire range of flexion (FIG. 16C). In the frontal plane, the model was offset more in varus compared to the experiment with an RMS difference of 1.8° and a maximum difference of 3.0° at 130° flexion (FIG. 16D). The tibia translated 2.3 mm medially in the model from 0 to 30° flexion, which differed from the experimental measurements by 0.5 mm. The model predicted increasing medial tibial translation of 2.8 mm from 30 to 130° flexion (FIG. 16E). However, the tibia translated laterally by 1.1 mm from 30 to 130° flexion in the experiment.

TABLE 4

Root mean square difference (RMSD) between experimentally measured and predicted kinematics during passive flexion from 0 to 130°.

| RMSD translation(mm) | | | RMSD rotation (°) | |
|---|---|---|---|---|
| Anterior | Distal | Lateral | Internal | Varus |
| 0.4 | 0.7 | 2.1 | 1.6 | 1.8 |

The computer model 700 captured two important features characteristic of passive knee flexion from full extension through deep flexion: 1) low ligament loads, and 2) coupled internal rotation and anterior translation of the tibia. That is, the computer model 700 demonstrated passive knee flexion including coupled internal rotation and anterior translation with flexion, from 0 to 130° flexion, as shown in FIGS. 16A and 16B.

In sum, the computational computer model 700 and method of constructing the computational computer model of a knee joint included identifying ligaments having a load at full extension, and identifying a ligament slack length of each ligament and incorporating said ligaments and slack lengths in a computational computer knee model. The computer model was capable of predicting knee kinematics and forces on a subject knee joint at low ligament loads and coupled anterior translation and internal rotation through a large range of passive flexion of the subject's knee joint. The computer model 700 provided valuable knee kinematic and kinetic (ligament loads, articular contact forces, meniscal forces, etc.) information in planning surgical techniques that rely on restoring knee joint function including ligament reconstructions, and bicruciate retaining, unicondylar, and total knee replacements.

Figure 17A:
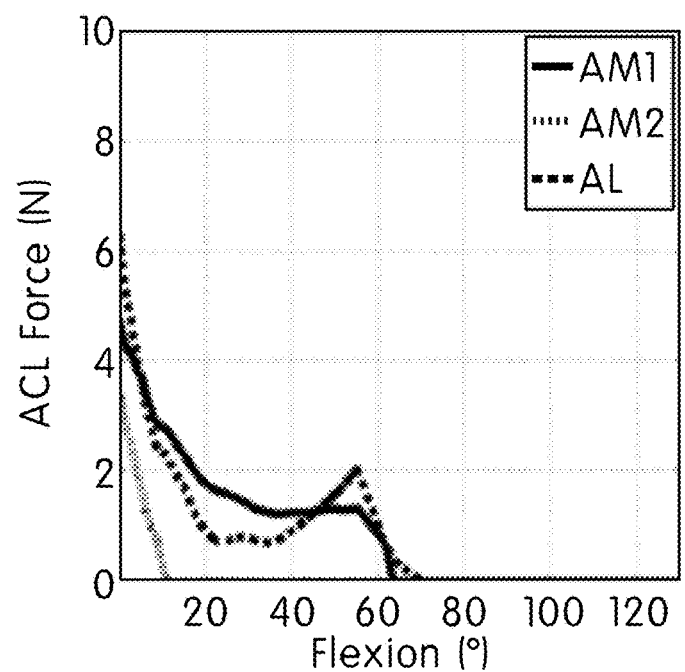
FIGS. 17A and 17B are graphs of predicted forces in individual fibers of the ACL throughout the flexion arc of 0-130 degrees: AM (2 fibers), AL (1 fiber) and PL (3 fibers)
Figure 17B:
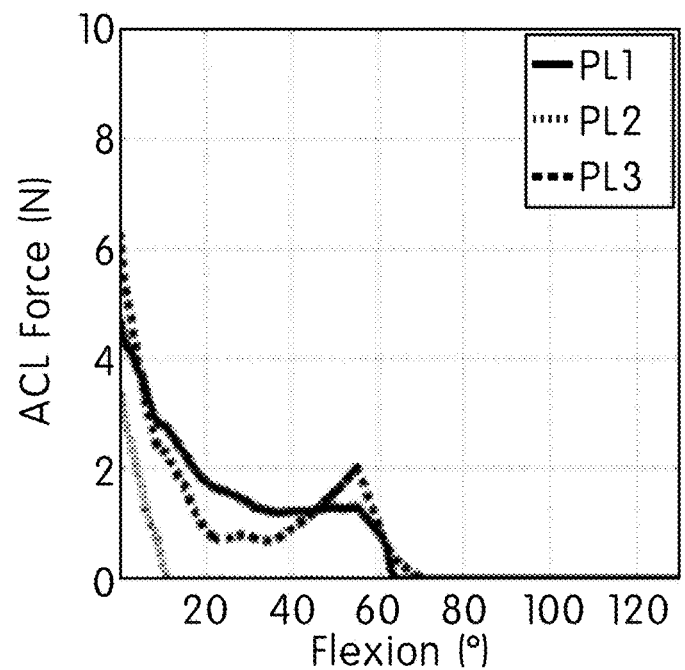

Furthermore, the fibers representing the ACL captured non-uniform force patterns through flexion (see FIGS. 17A and 17B), which can be used as a baseline to assess the response of the knee model to additional diverse loading conditions including those characteristics of functional activities and laxity testing.

Additional details regarding the computer model 700 and comparative analysis is disclosed in Kia M, Schafer K, Lipman J, Cross M, Mayman D, Pearle A, Wickiewicz T, Imhauser C., 2016, "A Multibody Knee Model Corroborates Subject-Specific Experimental Measurements of Low Ligament Forces and Kinematic Coupling During Passive Flexion," J. Biomech. Eng. Vol. 138, the entire disclosure of which is hereby incorporated by reference herein in its entirety for all purposes.

Example II

Figure 19:
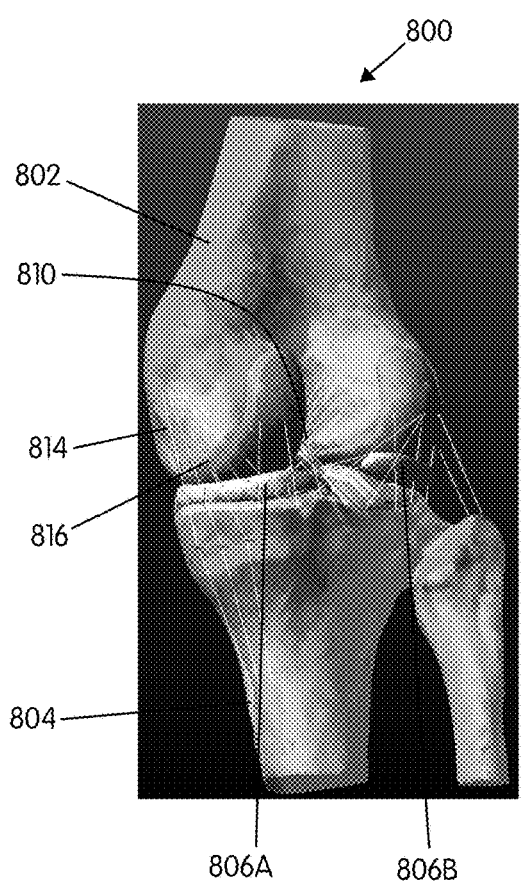
FIG. 19 is a posterior perspective view of a computer model of a knee joint in accordance with another exemplary embodiment of the present invention.
Figure 20:
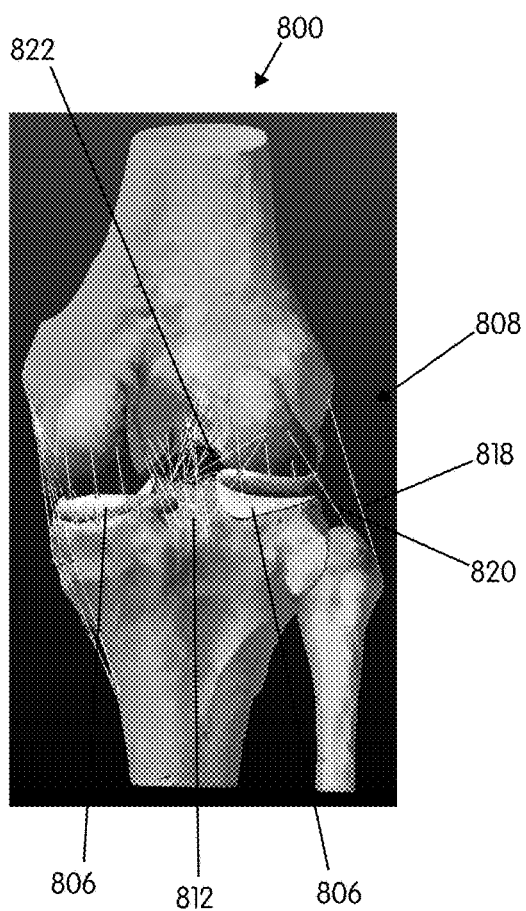
FIG. 20 is an anterior perspective view of the computer model of the knee joint of FIG. 19.

FIGS. 19 and 20, illustrate another exemplary example of a computer model of a knee joint in accordance with the present invention which can be constructed as disclosed above, but as further modified as discussed. The computer model of a knee joint or knee model 800 includes a femoral component 802, a tibial component 804, a meniscus 806 and a ligament assembly 808. Information regarding the various components of the knee model 800 can be obtained by conventional techniques and imported into the computer for development of their respective 3D models. The various components of the knee model are also configured to articulate or be movable relative to each other e.g., having the tibial component movable relative to the femoral component.

For example, the knee model 800 can be developed from computed tomography ("CT") and magnetic resonance imaging ("MRI") data of the femoral and tibial bones, articular cartilage, and menisci. Additionally, the meniscus geometry can be obtained in-situ using MRI via separate sagittal and coronal scans with a fast-spin echo (FSE) pulse sequence.

Radiopaque fiducial markers (accurate to about 0.3 mm and 0.3°) (e.g., L-frames as shown in FIG. 9) can also be rigidly mounted to the tibia and femur of a patient to enable registration of the bone geometries across coordinate systems of the CT scanner, the computer modeling environment, and physical experiments.

All bones, cartilage, menisci, and fiducial markers are exported in their respective scanner coordinate systems in .stl format and imported into a computer having a 3D computer modeling system, such as Geomagic Studio® manufactured by 3D Systems of Rock Hill, S.C. The 3D computer modeling system smooths, meshes, and converts to the .stl file into a parasolid format. Then, a 3D rigid transformation is applied which positions and orients the tibia relative to femur in full extension at predefined parameters such as, parameters defined in physical experiment used to position each geometry replicating this position. The solid 3D models created are then imported into a multibody dynamic software application system such as, ADAMS™ manufactured by MSC Software Corporation of Newport Beach, Calif.

The ligament assembly 808 of the knee model 800 constrains the femoral and tibial components. The ligament assembly can include an anterior cruciate ligament 810, a posterior cruciate ligament ("PCL") 812, a superficial medial collateral ligament ("sMCL") 814, a posterior oblique ligament ("POL") 806, a lateral collateral ligament ("LCL") 818, a fabellofibular ligament 820, and an oblique popliteal ligament ("OPL") 822.

The ligament insertion positions for each ligament of the ligament assembly 808 were identified via dissection of knee joint specimens, and/or guided by prominent osseous landmarks. Such prominent osseous landmarks can be identified via CT scans of a patient's knee joint. Each of the ligaments of the knee model are represented as single or multiple line elements based on their morphology, fiber architecture and to span their insertion areas.

The computer model of the knee joint can also include representations of the posterior capsule and meniscal horns along with their peripheral attachments, as shown in FIG. 19.

The ACL is constructed as a set of six fibers. The set of six fibers are oriented so as to originate on the tibia 804 just posterior to the ACL ridge and the ACL tubercle. Three fibers of the set of six fibers are located more anteriorly and span a width of the ACL insertion position from medial to lateral, while the remaining three fibers are located about 2 mm posteriorly to these fibers and also span the width of the ACL insertion position from medial to lateral. The ACL fibers inserted on the femur are located proximal to distal about 3 mm behind and parallel to the lateral epicondylar ridge.

The PCL is constructed as a set of seven fibers simulating the anterolateral and posteromedial fibers of the knee. Four fibers of the set of seven fibers span the posterior margin of the posterior intercondylar fossa of the tibia. The remaining fibers of the set of seven fibers include the anterolateral fibers and the femoral fibers. The anterolateral fibers are located about 2 mm anterior to the posteromedial fibers. The femoral fibers of the PCL are inserted parallel and just distal to the medial intercondylar ridge.

On the medial side of the knee, the sMCL is constructed as a set of three fibers spanning a width from anterior to posterior. The femoral attachment of the sMCL spans the depression just proximal and posterior to the medial epicondyle. The sMCL includes two tibial attachments, a proximal tibial attachment and a distal tibial attachment. The proximal tibial attachment is located about 1 cm distal to a joint line enabling rerouting of a line of action of the sMCL to account for wrapping around the medial aspect of the proximal tibia. The distal tibial attachments is positioned just anterior to the posteromedial crest and inserted distally at the distal curvature of the tibia about six cm distal to the joint line.

The POL is constructed as a set of three fibers to provide a broad insertion on the posteromedial aspect of the tibia. The femoral insertion site of the POL is located just distal and anterior to the gastrocnemius tubercle. The tibial insertion site of the POL stands the posteromedial corner of the tibia.

On the lateral side of the knee, the LCL is constructed as a single line fiber. The femoral insertion site of the LCL is located in a bony depression proximal and posterior to the lateral epicondyle. The LCL is also inserted in a small depression on the lateral aspect of the fibula head.

The posterior capsule of the knee model 800 included medial and lateral portions, each with three fiber elements. All fiber elements are configured so as to be inserted on the distal tibia and oriented proximally such that they are substantially tangent to the posterior articular cartilage of the femur.

On the posterolateral side of the knee, the fabellofibular ligament is constructed as a single line fiber that originates distally at the apex of the fibular head and inserted at the estimated location of the fabella laterally on the distal femur.

The oblique popliteal ligament is constructed as a set of two fibers representing its two distinct attachments proximally and distally on the posterior aspect of the lateral side of the knee. One fiber is configured to originate medially on the proximal tibia and continue laterally across the posterior aspect of the knee to the lateral aspect of the proximal femur at an estimated location of the fabella. The other fiber is configured to represent the distal lateral component of the OPL. It originates just lateral to the PCL and is inserted laterally on the proximal femur at the location of the fabella.

The meniscus 806 includes a medial meniscus 806A and a lateral meniscus 806B. The medial meniscus 806A is situated between the femoral and tibial components and constrained to the tibial bone 804 with a total of eleven linear spring elements. The anterior and posterior horns of the medial meniscus 806A are configured as two springs each. The peripheral attachments of the medial meniscus 806A are configured with two posterior, two anterior and three medial springs.

The lateral meniscus 806B is constrained to the tibial component 804 through its anterior and posterior horn attachments, which were configured as two linear springs each. Motion of the menisci relative to the tibial component is defined to translate and rotate parallel to the articular surface of their respective medial and lateral compartments using a planar constraint. That is, the meniscus 806 is constrained along a plane relative to at least one of the tibial bone 804 and femoral bone 802. Preferably, the meniscus is constrained along a plane relative to the tibial bone 804 by constraints configured as linear springs.

The structural properties of the ligaments of the ligament assembly 808 are configured as nonlinear springs having a tension-only, non-linear load-displacement relationship. The non-linear toe region and the linear region of the load-displacement response of each ligament are set at predetermined values. The non-linear toe-region was modelled by fitting the predetermined values using non-linear splines. Properties of the posterior capsule of the computer knee model were based on the properties of the sMCL due to their similar morphological broad thin structure and the properties of the FFL and OPL on the posterior oblique ligament since these structures form part of the posterior capsule. The horn and peripheral attachments are modeled as linear springs with a predetermined stiffness. The damping coefficient (for modeling linear springs of the horn and peripheral attachments) was chosen to be 1.5 N*s/mm based on experimental stress relaxation data of the cruciate ligaments.

Ligament slack length was determined using an optimization algorithm. Slack lengths of the cruciates, collaterals and capsular structures were defined such that the initial tension in any fiber did not exceed 10 N when allowing the knee model to move only in compression/distraction at full extension i.e., at zero degrees flexion.

The slack length properties of ligaments of the ligament assembly were derived from experimental data of resting tension in the modeled ligaments. Fixing the knee in all directions but compression/distraction when executing the optimization enables the tibia to maintain a consistent orientation and ML and AP position relative to the fixed femur and to resolve any overlap in cartilage surfaces e.g., <0.5 deg, <0.5 mm. The slack length of the PCL fibers was increased by about 20% of their length at full extension. This was done to correspond to their approximate length at 30° flexion, since the PCL fibers typically carry load at this angle to enable rollback of the femur relative to the tibia. The fibers representing the posterior capsule were decreased by about 5% of their length at full extension to create pretension in these structures since the posterior capsule is typically taut in extension.

Frictionless rigid body contact between the tibiofemoral articular cartilage was identified using a previously described interference detection algorithm that was part of the ADAMS™ modeling framework. Contact was similarly identified between menisci and femur, and between menisci and the femoral articular surfaces. Forces generated between contacting bodies was modeled as a non-linear function of penetration depth, x, and penetration velocity, ẋ.

$$F=k(x)^e+c(d)\dot{x}$$

To characterize contact between the cartilage surfaces of the tibia and femur, the penetration depth was scaled by a stiffness constant of 250 N/mm. The exponent term (2.2) modeled the nonlinear compressive properties of cartilage. The damping term (6 N*s/mm) reflected results from physical experiments where the load-time response of cartilage was fit to a 2nd order differential equation. To reduce the nonlinearity associated with damping forces, the knee model was prescribed to achieve its maximum value at a penetration depth of 0.5 mm. All contact parameters were the same to describe interaction between meniscus and bone tissue. Contact between the menisci and the femoral articular cartilage and between the femur was about 20% less stiff (k=200 N/mm), while all other parameters were kept the same as described above. Contact was defined to be frictionless for all interactions, but a frictional term could also be included.

The mass of the tibial bone 804 and the femoral bone 802 were calculated based on an average density of cortical and cancellous bones and assumed to be distributed equally throughout the tibia and femur. For example, bone mass was based on a mean reported bone density of 1600 kg/m³ and was assumed to be uniformly distributed throughout each bone geometry. Since the masses of the tibia and femur were small (10 N), and loads were applied slowly the effect of inaccuracies in bone mass on the predicted passive mechanics were assumed to be negligible. The effect of gravity was also neglected in simulations.

The equations of motion were generated and solved using ADAMS™. Initial conditions, boundary conditions, loading conditions, and kinematic description were set to match those obtained experimentally. A variable order, variable step size integration method e.g., the GSTIFF integrator, was used to solve the equations of motion, with integrator error 0.001, and maximum integrator step size 0.001.

Additionally, the ligaments of the ligament assembly 808 are configured to have a predetermined linear stiffness. Table 5 shows exemplary stiffness values per fiber for each of the ligaments of the ligament assembly.

TABLE 5

| Structure | Stiffness per fiber (N/mm) | Number of fibers |
|---|---|---|
| Anterior cruciate ligament | | |
| anterolateral fibers | 19.1 | 1 |
| poserolateral fibers | 9.6 | 3 |
| anteromedial fibers | 12.7 | 2 |
| Posterior cruciate ligament | | |
| anterolateral fibers | 40 | 3 |
| posteromedial fibers | 14.3 | 4 |
| Medial collateral ligament | | |
| proximal fibers | 53.3 | 3 |
| distal fibers | 53.3 | 3 |
| proximal tibial attachments | 50 | 3 |
| Posterior oblique ligament | 18.7 | 3 |
| Lateral collateral ligament | 59 | 1 |
| Posterior capsule | | |
| medial | 80 | 3 |
| lateral | 80 | 3 |
| Oblique popliteal ligament | | |
| proximal lateral attachment | 56 | 1 |
| distal lateral attachment | 56 | 1 |
| Fabellofibular ligament | 56 | 1 |
| Lateral meniscal horns | | |
| anterior | 125 | 2 |
| posterior | 125 | 2 |
| Medial meniscal horns | | |
| anterior | 125 | 2 |
| posterior | 125 | 2 |
| Peripheral medial meniscus attachments | | |
| anterior | 36 | 2 |
| medial | 36 | 3 |
| posterior | 36 | 2 |

Computer Knee Model Evaluation

The computational knee model 800 was compared on a specimen-by-specimen basis against a total of ten cadaver knees using data from physical experiments that were obtained from a robotic testing system. The robotic system enabled application of controlled forces and moments and measurement of the 6 degrees of freedom (DOF) kinematics of the knee. Evaluation experiments were conducted for a simulated pivot shift exam because of its clinical importance in predicting outcome following ACL injury and reconstruction and because it relies on application of torques in multiple planes, thus it loads multiple support structures including the ACL, sMCL, POL, as well as the lateral meniscus.

The robotic test system included a six degrees of freedom (DOF) robot with a universal load cell mounted on its end effector. The tibia of the cadaver knee specimen is fixed to the end effector of the robot through a custom fixture, while the femur is rigidly fixed to the ground through another specially made fixture. After mounting the knee on the robot in full extension, it is registered to the robot through a 3D digitizer. The digitizer was used to identify anatomical landmarks and define a common clinical description for knee motions. The fiducial markers were rigidly fixed to the tibia and femur and identified in this position to provide a common reference to link the CT data of each bone back to their position and orientation in the robot experiment.

The control structure of the robot relies on force feedback and a Newton-Raphson algorithm to identify the position of the tibia relative to the femur that minimizes the difference between the current load on the knee and the desired load on the knee within specified tolerances (5N and 0.5 Nm resultant force and moment, respectively). Initially, the path of knee flexion that minimizes the external forces and torques is identified from 0 to 90° flexion. This provides the reference position for all subsequent loading conditions.

A simulated pivot shift was performed using the robotic system by applying combined abduction (8 Nm) and internal rotational moments (4 Nm) to the tibia at 15° flexion while allowing unconstrained motion in all remaining degrees of freedom. The abduction moment was first increased to 8 Nm in five increments (0.8, 2, 4, 6, 8 Nm). Then, the abduction moment was held constant and the internal rotation moment was increased to 4 Nm in six increments (0.4, 0.8, 1.2, 2, 3, 4 Nm). The five DOF kinematics that satisfied these loading conditions was recorded at each increment.

Subsequently, the principle of superposition was employed to determine the loads generated in the ACL, sMCL, POL, and LCL in response to the combined abduction and internal rotation moments. Specifically, the five DOF kinematics were repeated for the simulated pivot shift before and after sectioning each ligament. The magnitude of the difference in force across the knee corresponded to the force carried by that structure.

The mean difference in position and orientation between the computer model and the experiment for each increment of the applied moment were calculated along with the mean difference in compliance between the computer model and the experiment for the internal rotation portion of the combined moment. The mean compliance for each increment of applied internal rotation moment was defined as from 0 to 1.2 Nm and then for each increment of applied internal rotation moment from 1.2 to 4 Nm. The mean difference in load between measures from the physical experiment and those generated by the computer model for the ACL, sMCL, POL and LCL were then calculated.

Computer Model of Knee Joint Evaluations Results

The net knee displacements of cadaver specimens in both coupled anterior translation and internal rotation of ±2 mm (range: −4.6 to 2.6 mm) and ±5° (range: 8.6 to) 26.8°, respectively, in response to combined moments are presented in Table 6.

TABLE 6

Net displacements of each individual cadaver specimen as obtained from robotic testing in response the combined moments. ML = medial-lateral, AP = anterior-posterior, IE = internal-external, VV = varus-valgus. SD = standard deviation.
Experimental Kinematics

| Specimen | ML (mm) | AP (mm) | IE (°) | VV (°) |
|---|---|---|---|---|
| 2 | −0.5 | −1.1 | −10.4 | 1.3 |
| 4 | −2.1 | −1.5 | −18.7 | 2.6 |
| 5 | −1.2 | −2.2 | −11.9 | 2.6 |
| 6 | −2.6 | 1.4 | −26.8 | 1.8 |
| 7 | −1.6 | −2.0 | −14.9 | 2.5 |
| 8 | −2.0 | −0.8 | −8.6 | 2.7 |
| 9 | −2.2 | 2.6 | −13.0 | 2.2 |
| 11 | −2.3 | −4.6 | −11.0 | 1.2 |
| 12 | −0.8 | −1.6 | −9.3 | 1.7 |
| 13 | −2.5 | −1.0 | −19.4 | 3.3 |
| Mean | −1.8 | −1.1 | −14.4 | 2.2 |
| SD | 0.7 | 2.0 | 5.7 | 0.7 |

In sum, variability in net knee displacement in coupled medial translation and valgus was less yielding ±0.7 mm and ±0.7°, respectively.

One-to-one comparison of the model predictions with their corresponding experimental data yielded an RMS error across all increments of applied load between 0.2 and 3.0 mm in medial translation, between 0.8 and 4.0 mm in anterior translation, between 2.3 and 12.2° in internal rotation, and between 0.5 and 2.1° in valgus (see Table 7). The computer models of knees with less range of motion in their physical experiments (knees 6 through 9) tended to have higher RMS error than those with larger experimentally measured range of motion. The computationally predicted forces in the ACL, sMCL, and POL were higher than those measured in the cadaver experiments, but yielded similar engagement patterns. The experimentally measured forces in the LCL were no greater than 20N across all specimens, and this was reflected in the model predictions.

TABLE 7

RMS error of the differences between the computer model and the experiment in knee kinematics and ligament loads across each loading increment of the combined moments.

| | Kinematics | | | | Ligament Loads | | | |
|---|---|---|---|---|---|---|---|---|
| Specimen | ML (mm) | AP (mm) | IE (°) | VV (°) | ACL (N) | sMCL (N) | POL (N) | LCL (N) |
| 2 | 0.9 | 1.1 | 2.3 | 0.5 | 10.7 | 52.6 | — | 6.3 |
| 4 | 1.4 | 1.6 | 6.6 | 1.4 | 14.7 | 41.1 | 3.1 | 3.8 |
| 5 | 1.5 | 1.4 | 6.4 | 0.9 | 23.9 | 31.5 | 18.4 | 17.2 |
| 6 | 0.9 | 2.4 | 3.2 | 1.4 | 24.3 | 31.4 | 31.0 | 12.4 |
| 7 | 0.2 | 1.3 | 5.8 | 0.5 | 39.2 | 65.8 | — | 3.2 |
| 8 | 1.8 | 0.8 | 8.1 | 0.9 | 18.6 | 54.7 | 12.4 | 2.7 |
| 9 | 3.0 | 2.6 | 8.8 | 0.9 | 19.5 | 35.4 | 27.1 | 11.3 |
| 11 | 1.9 | 4.0 | 8.6 | 0.9 | 28.1 | 53.8 | 15.8 | 8.0 |
| 12 | 1.8 | 1.1 | 12.2 | 1.6 | 33.8 | 48.0 | 41.3 | 4.5 |
| 13 | 1.9 | 0.8 | 4.9 | 2.1 | 17.5 | 29.3 | 17.6 | 3.1 |

ML = medial-lateral, AP = anterior-posterior, IE = internal-external, VV = varus-valgus.

The results of the computer model of the knee joint evaluation illustrate that the computer knee model can simulate subject-specific responses of actual patients across a population spectrum. As such, the computer knee model provides a useful tool for treatment planning by physicians thereby providing the ability to achieve better outcomes e.g., following ACL injury and reconstruction.

Method of Computer Model Development

Models from ten knees (8 male, mean age: 53.3±12.5 yrs, range: 29-65 yrs) were developed from computed tomography and magnetic resonance imaging data of the bones, articular cartilage, and menisci. All knees were scanned at 140 kV and 140 mA settings. One axial CT scan of each knee was obtained before testing using a 64 slice scanner (Biograph mCT, Siemens, Malvern, Pa.). The CT scanning consisted of 0.6 mm thick slices with in-plane pixel dimensions of 0.5×0.5 mm$^2$. A second CT scan was taken of the disarticulated tibia and femur after completing the physical experiment. The disarticulated tibia and femur were dissected free of all surrounding soft tissues so that each consisted solely of bone and cartilage. This enabled identification of the cartilage surfaces using MIMICS® software application from Materialise HQ of Leuven, Belgium from the underlying bone based on their disparate grey values on a sagittal CT scan. Cartilage tissue typically was identified via thresholding between grey values of −700 and 600.

Meniscal geometries were obtained in-situ using MRI via separate sagittal and coronal scans with a fast-spin echo (FSE) pulse sequence. The knee rested within the 3 Tesla MRI scanner (manufactured from General Electric) in approximately 10° flexion within a standard four channel knee coil. Scan parameter were 1 mm slice thickness and in-plane resolution of 0.42×0.42 mm, repetition time (TR) 4900 ms, echo time (TE) 20 ms, matrix 480×480 (coronal), field of view (FOV) 20 cm, slice thickness (ST) 1 mm, echo train length (ETL) of eight and number of acquisitions (NEX) of two. Meniscal geometries were identified in both scanning planes using MIMICS.

Example III

Figure 21:
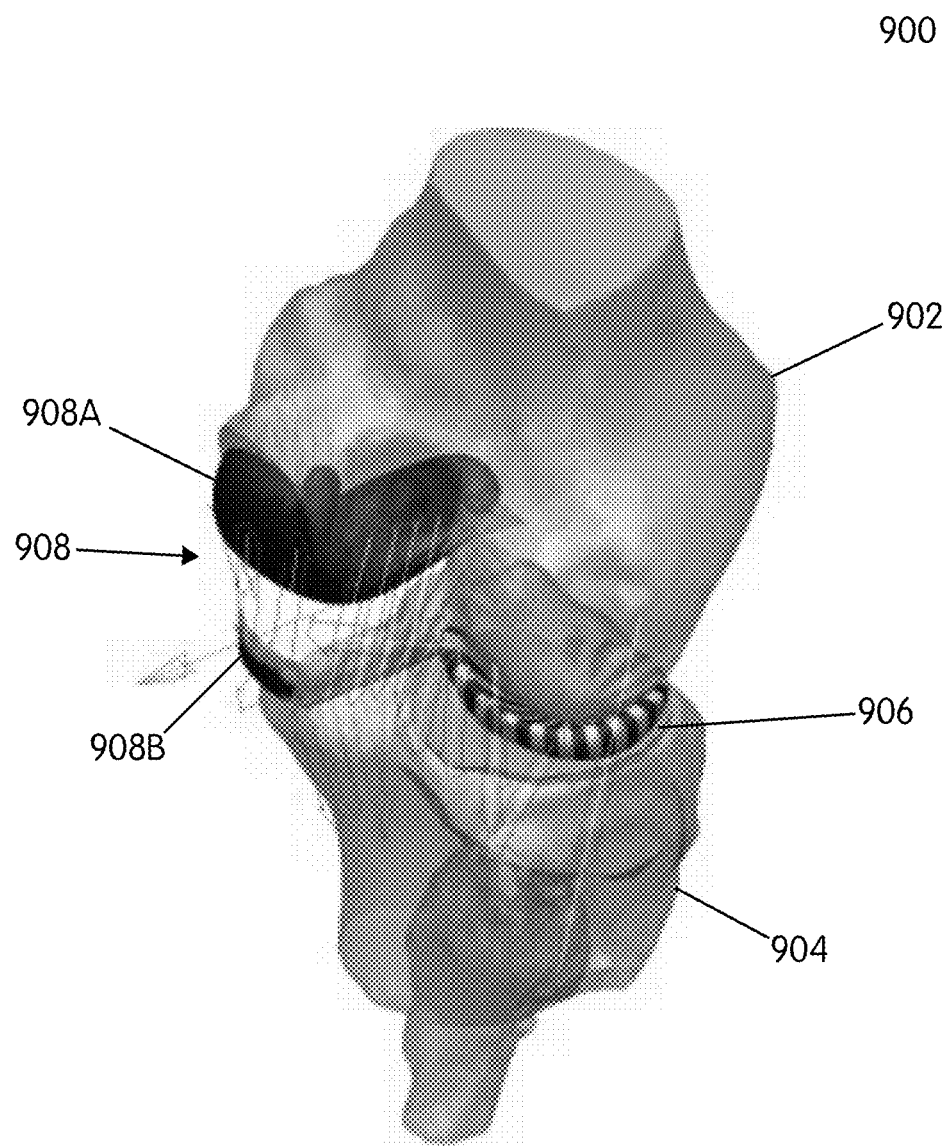
FIG. 21 is a rear perspective view of a computer model of a knee joint in accordance with yet another exemplary embodiment of the present invention.

The following illustrative example, and not by way of limitation, describes the development of a computer knee model as illustrated in FIG. 21 and applied to a UKA.

Two computational knee models 900 with subject-specific bone geometries 902 (femur), 904 (tibia), articular cartilage 906, lateral menisci, and UKA 908 were developed in a dynamic multi-body frame work (FIG. 21). Ligament insertions were identified for the ACL, PCL, sMCL, POL, LCL, posterior capsule, and meniscal horns. The ligaments were represented with multiple force elements to cover their insertion areas; mean structural properties were described using a tension-only, non-linear load-displacement relationship. The lateral meniscus geometry was discretized radially into small wedge-shaped elements with a 6×6 stiffness matrix connecting neighboring elements to represent a deformable geometry. Compliant contact elements were defined between lateral meniscus and the femoral and tibial articular surfaces as a non-linear function of penetration depth and velocity.

The 3D geometries of the femoral 908A and tibial 908B components of a Stryker Triathlon® unicompartmental knee were developed using a desktop 3D laser scanner and Geomagic Studio® software. A fellowship-trained arthroplasty surgeon matched the femoral and tibial component geometries to the articular surfaces in the frontal and sagittal planes using CT scans for two specimens (58 and 62 yr-old. male right knees).

Next, the effect of varying the position and orientation of the tibial component on predicted ligament loads was evaluated. Six different directions (3 translations and 3 orientations) were assessed with respect to a reference located at the center of the tibial insert (marker $O_t$). Evaluations with the computer model were conducted of ligament loads as the knee was driven through a simulated passive flexion path from 15 to 120° flexion while applying a 10 N compressive axial force to the tibia. A range of ±2 mm and ±2° was considered as a space design for the translation and rotation parameters, respectively.

The root mean square (RMS) of the predicted load for four major ligaments during passive flexion were calculated. See FIGS. 22A and 22B. Box-Behnken algorithm was employed to estimate regression coefficients as direct measures of sensitivity of ligament loads into different parameters (R2>0.9).

Figure 22A:
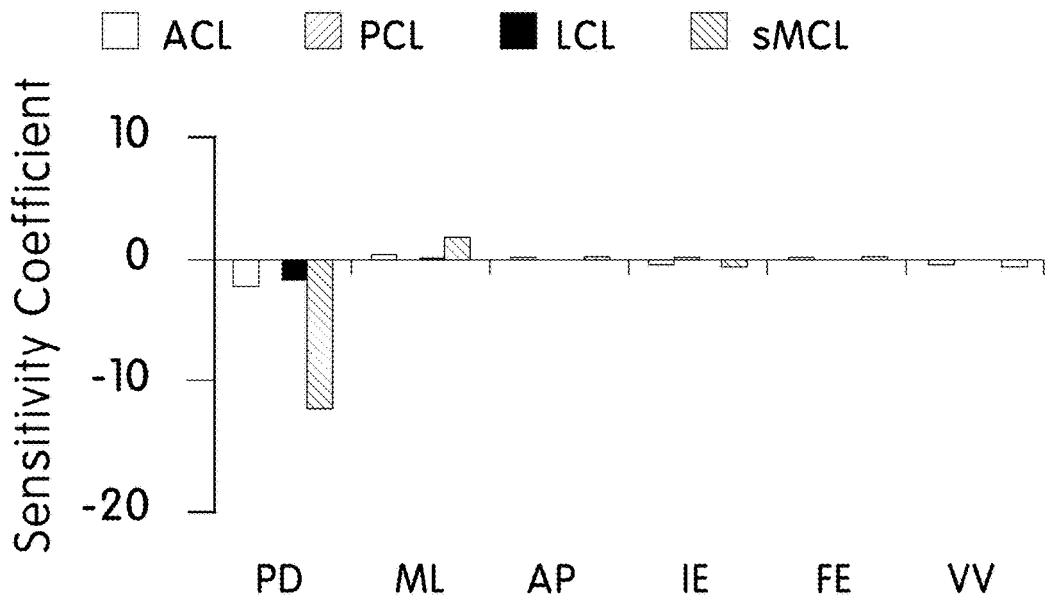
FIGS. 22A and 22B are graphs of sensitivity coefficients for computer models of a uni-condylar computer model of a joint.
Figure 22B:
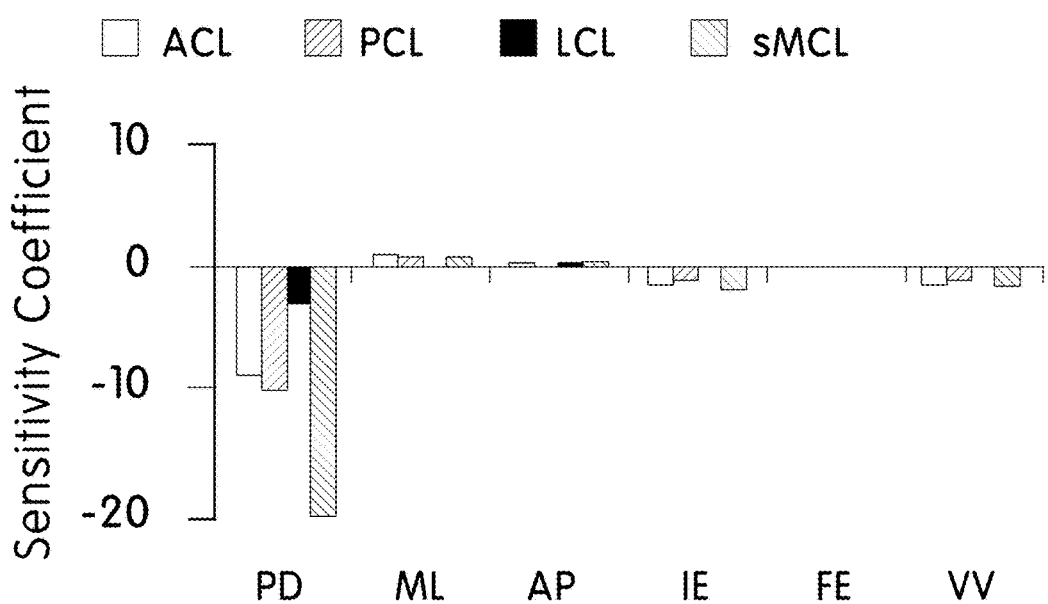

The proximal-distal (PD) position of the tibial tray was the dominant factor controlling ligament loads in both models (FIGS. 22A, 22B). Specifically, moving the tibial tray more proximally, which is equivalent to overstuffing the joint, increased the load in ligaments in both knee-specific models. However, ligament loads in Knee 2 were three times more sensitive to the changes in PD as compared to Knee 1. The effect of manipulating the implant in other directions on ligament loads was knee-dependent. In Knee 1, the MCL loads were particularly sensitive to the medial-lateral parameter (ML+1.6 N/mm); positioning the implant more medially decreased the load. Conversely, in Knee 2, loads were more sensitive to internal-external rotation of the implant (IE−1.7N/°) and varus-valgus (VV−1.7N/°) orientation. Specifically, we found that positioning the implant more externally and more valgus would decrease the loads. LCL load showed the least sensitivity in both knees. The regression equation technique predicted the outcomes well with the exception of the PCL load on Knee 1 (R2=0.8).

The data demonstrated that small changes in implant position and orientation can alter ligament loads, especially in the medial collateral ligament. These changes may affect loading patterns at the articulating surfaces which in turn may have implications for prosthesis failure and progression of osteoarthritis in the remaining compartment.

Ligament loads were most sensitive to changes in the proximal-distal position of the implant especially the MCL, but also the PCL and ACL. However, the magnitude of the effect varied across our two knee models during passive flexion. This may indicate the importance on a patient-specific basis of identifying the optimal implant position that prevents excessive ligament loads through a high range of knee flexion. The ability of implant positioning to effect load on the cruciates is also an important finding since they play a major role in knee stability and enabling proper rollback of the femur with flexion. The effect of implant alignment was different between the two knees. The variability between the two knees outcomes may be attributed to differences in their anatomical shapes, fiber orientations, and mechanical properties that described the ligaments in the models.

Overstuffing seems to increase load in ligaments and should therefore be avoided. A sensitivity approach in combination with computational modeling are valuable preoperative planning tools for considering the effect of implant alignment on the knee mechanics. These techniques may be used for subject-specific surgical treatment of the knee.

All of the above discussed references, including patents, published patent applications, software, articles and journal papers, are hereby incorporated by reference in their entirety for all purposes.

It will be appreciated by those skilled in the art that changes could be made to the embodiments described above without departing from the broad inventive concept thereof. It is to be understood, therefore, that this invention is not limited to the particular embodiments disclosed, but it is intended to cover modifications within the spirit and scope as defined in the claims.

We claim:

1. A method for creating a computer model of a patient specific joint for treatment planning, comprising:
    identifying a ligament of a joint of a patient under a load at a predefined position of the joint; and
    constructing, with the use of a computer, a computer model of the joint of the patient having:
    a first bone model,
    a second bone model, and
    a ligament model connecting the first and second bone models corresponding to the identified ligament, wherein the ligament model is constructed as at least one fiber based on a predefined slack length determined by the following objective function $$\min \sum_{i=1}^{y} \left( \left| \sum_{j=1}^{a_i} F_{i,j}^m(l, \dot{l}, l_0) \right| - F_i^e \right)^4$$

wherein y is a number of ligament models, $a_i$ is a number of fibers for the ligament model, $F_i^e$ is a predetermined force carried by the identified ligament at the predefined position, $l_0$ is a slack length of the ligament, $l_e$ is a fiber length at the predefined position for each fiber, and $F_{i,j}^m$ is a force of a fiber of the at least one fiber of the ligament model at the predefined position determined by the following Equation 1:

$$F(l, \dot{l}, l_0) = \qquad (1)$$
$$\frac{1}{n} \{ [f^*(l) + c_d \dot{l} B_1] B_2 + [K(l - (l_0 + \Delta_t)) + f^*(l_0 + \Delta_t) + c_d \dot{l} B_1] B_3 \}$$

-continued $$B_1 = \text{step}(\dot{l}, 0, 0, \dot{l} + 0.1, 1)$$

$$B_2 = \text{step}(l, l_0, 0, l_0 + 0.1, 1) \times \text{step}(l, (l_0 + \Delta_t), 1, (l_0 + \Delta_t) + 0.001, 0)$$

$$B_3 = \text{step}(l, (l_0 + \Delta_t), 0, (l_0 + \Delta_t) + 0.001, 1)$$

wherein, n is the number of fibers, l is the inter-insertional distance, $\dot{l}$ is the first derivative of the inter-insertional distance with respect to time, f*(l) is a cubic spline of a ligament force-elongation response in a toe region, K represents a linear portion of a force-elongation response, $\Delta_t$ is a transition between the toe region and the linear region, $B_{1,2,3}$ are step functions, and $c_d$ is a damping term constant.

2. The method of claim 1, further comprising determining a load for the identified ligament, and wherein the predefined slack length is based on the determined target load.

3. The method of claim 1, further comprising determining a length of the at least one fiber at the predefined position, and wherein the predefined slack length is based on the determined length of the at least one fiber at the predefined position.

4. The method of claim 1, further comprising outputting on a display operatively connected to the computer forces predicted by the computer model of the joint as it simulates a range of motion.

5. The method of claim 4, wherein the forces predicted by the computer model of the joint is a ligament load on the ligament model, a contact force between the first and second bone models, or a directional force of movement of one of the first and second bone models relative to the other of the first and second bone models.

6. The method of claim 4, wherein the computer model further includes a menisci, and wherein the forces predicted by the computer model of the joint is a contact force on the menisci or between the menisci and at least one of the first and second bone models.

7. The method of claim 1, further comprising outputting on a display operatively connected to the computer kinematic motion predicted by the computer model of the joint as it simulates a range of motion.

8. The method of claim 1, wherein the computer model of the joint is a knee joint, an ankle joint, a hip joint, an elbow joint, a wrist joint, a finger joint, a toe joint, patellofemoral joint or a shoulder joint.

9. The method of claim 1, wherein the computer model of the joint is a knee joint and the ligament model is a model of an anterior cruciate ligament, a posterior cruciate ligament, a superficial medial collateral ligament, a posterior oblique ligament, a medial posterior capsule, a lateral posterior capsule ligament, a lateral collateral ligament, an anterolateral ligament, a fabellofibular ligament, a coronary ligament, or a lateral coronary ligament.

10. The method of claim 1, wherein the ligament model includes a predetermined linear or non-linear stiffness.

11. The method of claim 1, further comprising acquiring at least one of image data and geometric data of the joint of the patient, and wherein constructing the computer model of the joint is based on the acquired at least one of image data and geometric data.

12. The method of claim 1, wherein the predefined position is at full extension of the joint.

13. A method of developing a treatment plan for treating a joint of a patient comprising:

identifying at least one ligament of a joint of a patient carrying a load at a predefined position of the joint;

constructing, with the use of a computer, a computer model of the joint of the patient having ligament models corresponding to the identified at least one ligament, wherein each of the ligament models is constructed as at least one fiber based on a predefined slack length determined by the following objective function $$\min \sum_{i=1}^{y} \left( \left| \sum_{j=1}^{a_i} F_{i,j}^m(l, \dot{l}, l_0) \right| - F_i^e \right)^4$$

wherein y is a number of ligament models, $a_i$ is a number of fibers for each ligament model, $F_i^e$ is a predetermined force carried by each identified ligament at the predefined position, $l_0$ is a slack length of the ligament, $l_e$ is a fiber length at the predefined position for each fiber, and $F_{i,j}^m$ is a force carried by a fiber of the at least one fiber at the predefined position determined by the following Equation 1:

$$F(l, \dot{l}, l_0) = \tag{1}$$

$$\frac{1}{n}\{[f^*(l) + c_d \dot{l} B_1] B_2 + [K(l - (l_0 + \Delta_t)) + f^*(l_0 + \Delta_t) + c_d \dot{l} B_1] B_3\}$$

$$B_1 = \text{step}(\dot{l}, 0, 0, \dot{l} + 0.1, 1)$$

$$B_2 = \text{step}(l, l_0, 0, l_0 + 0.1, 1) \times \text{step}(l, (l_0 + \Delta_t), 1, (l_0 + \Delta_t) + 0.001, 0)$$

$$B_3 = \text{step}(l, (l_0 + \Delta_t), 0, (l_0 + \Delta_t) + 0.001, 1)$$

wherein, n is the number of fibers, l is the inter-insertional distance, $\dot{l}$ is the first derivative of the inter-insertional distance with respect to time, f*(l) is a cubic spline of a ligament force-elongation response in a toe region, K represents a linear portion of a force-elongation response, $\Delta_t$ is a transition between the toe region and the linear region, $B_{1,2,3}$ are step functions, and $c_d$ is a damping term constant;

outputting on a display operatively connected to the computer at least one of forces and motions predicted by the computer model of the joint as it simulates a range of motion; and developing a treatment plan for surgically treating the joint based on the at least one of forces and motions predicted by the computer model.

14. The method of claim 13, further comprising treating the patient based on the developed treatment plan.

15. The method of claim 13, further comprising determining loads carried by the identified at least one ligament, determining target loads for the identified at least one ligament, and determining lengths of the at least one fiber, and wherein the predefined slack length is based on the determined load, the determined target load of the at least one ligament, and the determined length of the at least one fiber.

16. The method of claim 13, wherein the predefined position is at full extension of the joint.

17. An apparatus comprising a processor, a display, and a non-transitory computer-readable medium that includes computer instructions executable by the processor to:

receive an identification of at least one ligament of a joint of a patient carrying a load at a predefined position;

create a computer model of a patient specific joint that includes:

a first bone model, a second bone model, and a ligament assembly model constraining the first and second bone models, wherein the ligament assembly model includes ligaments corresponding to the identification of at least one ligament each constructed as at least one fiber having a predefined slack length;

determine the predefined slack length based on the following objective function $$\min \sum_{i=1}^{y} \left( \left| \sum_{j=1}^{a_i} F_{i,j}^m(l, \dot{l}, l_0) \right| - F_i^e \right)^4$$

wherein y is a number of ligaments of the ligament assembly model, $a_i$ is a number of fibers for each ligament of the ligament assembly model, $F_i^e$ is a predetermined force carried by each identified ligament at the predefined position, $l_0$ is a slack length of the ligament, $l_e$ is a fiber length at the predefined position for each fiber, and $F_{i,j}^m$ is a force carried by a fiber of the at least one fiber at the predefined position determined by the following Equation 1:

$$F(l, \dot{l}, l_0) = \frac{1}{n}\{[f^*(l) + c_d \dot{l} B_1]B_2 + [K(l - (l_0 + \Delta_t)) + f^*(l_0 + \Delta_t) + c_d \dot{l} B_1]B_3\} \quad (1)$$

$$B_1 = \text{step}(\dot{l}, 0, 0, \dot{l} + 0.1, 1)$$

$$B_2 = \text{step}(l, l_0, 0, l_0 + 0.1, 1) \times \text{step}(l, (l_0 + \Delta_t), 1, (l_0 + \Delta_t) + 0.001, 0)$$

$$B_3 = \text{step}(l, (l_0 + \Delta_t), 0, (l_0 + \Delta_t) + 0.001, 1)$$

wherein, n is the number of fibers, l is the inter-insertional distance, $\dot{l}$ is the first derivative of the inter-insertional distance with respect to time, f*(l) is a cubic spline of a ligament force-elongation response in a toe region, K represents a linear portion of a force-elongation response, $\Delta_t$ is a transition between the toe region and the linear region, $B_{1,2,3}$ are step functions, and $c_d$ is a damping term constant;

simulate a range of motion of the computer model to determine at least one of forces and motions predicted as the joint travels through the range of motion; and output on the display the computer model of the joint and the predicted at least one of forces and motions of the joint generated by the computer model.

18. The apparatus of claim 17, wherein the predefined position is at full extension.

* * * * *